US010697891B2

(12) United States Patent
Nakanishi et al.

(10) Patent No.: US 10,697,891 B2
(45) Date of Patent: Jun. 30, 2020

(54) TERAHERTZ WAVE SPECTROSCOPIC MEASUREMENT DEVICE

(71) Applicant: HAMAMATSU PHOTONICS K.K., Hamamatsu-shi, Shizuoka (JP)

(72) Inventors: Atsushi Nakanishi, Hamamatsu (JP); Kazuue Fujita, Hamamatsu (JP); Kazuki Horita, Hamamatsu (JP)

(73) Assignee: HAMAMATSU PHOTONICS K.K., Hamamatsu-shi, Shizuoka (JP)

( * ) Notice: Subject to any disclaimer, the term of this patent is extended or adjusted under 35 U.S.C. 154(b) by 0 days.

(21) Appl. No.: 16/245,355

(22) Filed: Jan. 11, 2019

(65) Prior Publication Data

US 2019/0234871 A1    Aug. 1, 2019

(30) Foreign Application Priority Data

Jan. 29, 2018   (JP) .................................. 2018-012281

(51) Int. Cl.
*G01N 21/35* (2014.01)
*G01J 3/02* (2006.01)
(Continued)

(52) U.S. Cl.
CPC ........ *G01N 21/3586* (2013.01); *G01J 3/0208* (2013.01); *G01J 3/0213* (2013.01); *G02B 17/04* (2013.01); *G01J 3/42* (2013.01)

(58) Field of Classification Search
CPC .......... G01J 3/0208; G01J 3/0213; G01J 3/42; G01N 21/31; G01N 21/35; G01N 21/3581;
(Continued)

(56) References Cited

U.S. PATENT DOCUMENTS

| 8,415,625 B2 * | 4/2013 | Nakanishi ............ G01N 21/552 250/341.1 |
| 2014/0014840 A1 * | 1/2014 | Yasuda ............... G01N 21/3581 250/339.07 |

(Continued)

FOREIGN PATENT DOCUMENTS

| JP | 5231538 B2 | 7/2013 |
| JP | 2017-33981 A | 2/2017 |
| WO | WO-2009/133853 A1 | 11/2009 |

OTHER PUBLICATIONS

Yuma Takida et al., "Nonlinear optical detection of terahertz-wave radiation from resonant tunneling diodes," Optics Express, Mar. 6, 2017, pp. 5389-5396, vol. 25, No. 5.

(Continued)

*Primary Examiner* — Mark R Gaworecki
(74) *Attorney, Agent, or Firm* — Faegre Drinker Biddle & Reath LLP

(57) ABSTRACT

A terahertz wave spectroscopic measurement device includes a light source that emits a terahertz wave and probe light having a wavelength different from that of the terahertz wave, an internal total reflection prism including an incidence surface of the terahertz wave, a placement surface on which a measurement target is placed, and an emission surface of the terahertz wave, the internal total reflection prism internally totally reflecting the terahertz wave incident from the incidence surface by means of the placement surface and emitting the terahertz wave from the emission surface, and a terahertz wave detection unit that indirectly detects the terahertz wave emitted from the emission surface using the probe light. The internal total reflection prism includes an avoidance portion on which incidence of the probe light on the measurement target on the placement surface is avoided.

11 Claims, 15 Drawing Sheets

(51) Int. Cl.
*G01J 3/42* (2006.01)
*G02B 17/04* (2006.01)
*G01N 21/3586* (2014.01)

(58) Field of Classification Search
CPC ............ G01N 21/3586; G01N 21/359; G01N 21/552; G02B 5/04; G02B 17/04
See application file for complete search history.

(56) References Cited

U.S. PATENT DOCUMENTS

2015/0136986 A1* 5/2015 Akiyama ........... G01N 21/3581
250/339.06
2017/0336259 A1* 11/2017 Kawada .................... G01J 3/14

OTHER PUBLICATIONS

Vladimir V. Kornienko et al., "Terahertz continuous wave nonlinear-optical detection without phase-locking between a source and the detector," Optics Letters, Sep. 1, 2016, pp. 4075-4078, vol. 41, No. 17.

* cited by examiner

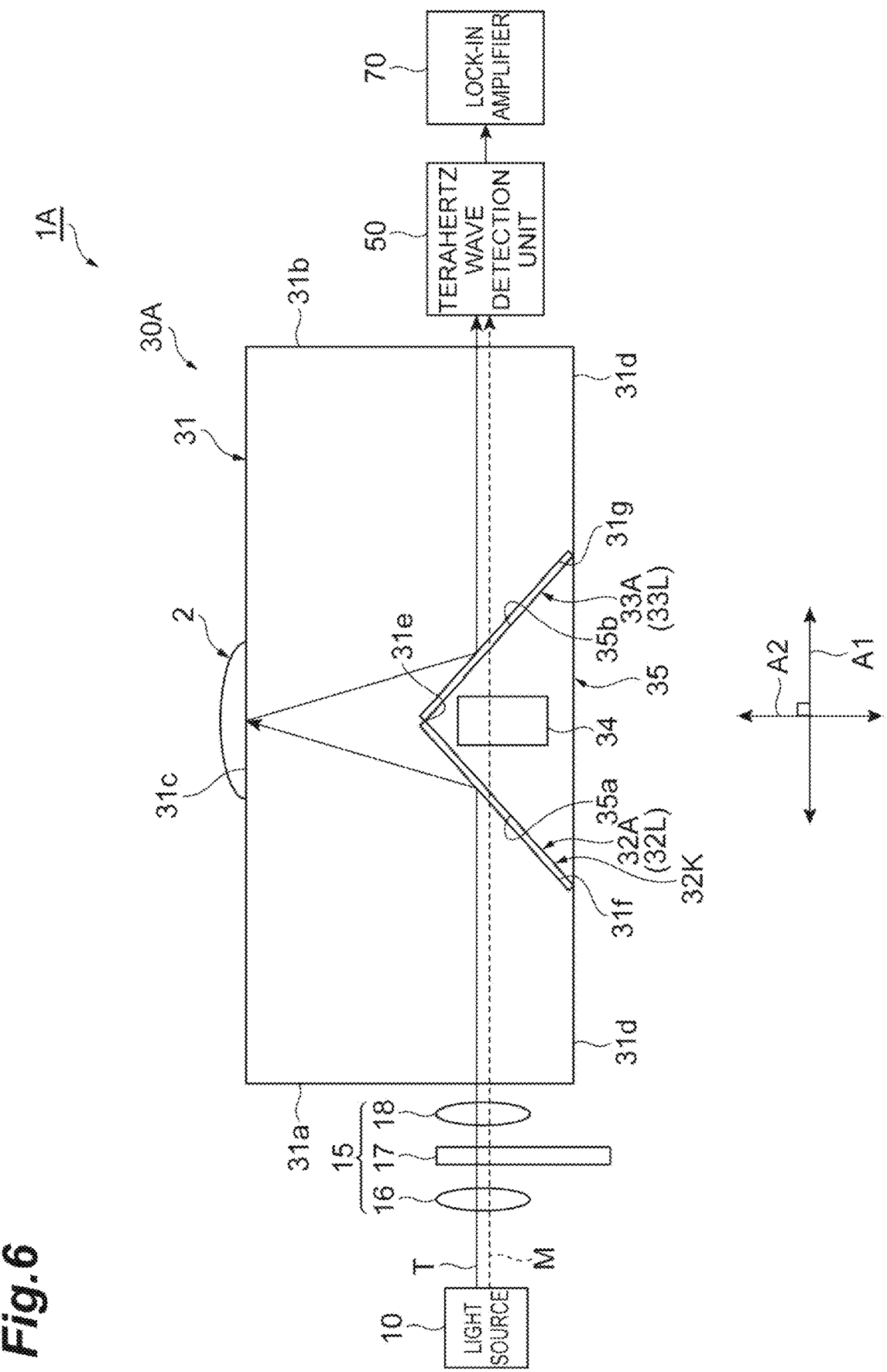

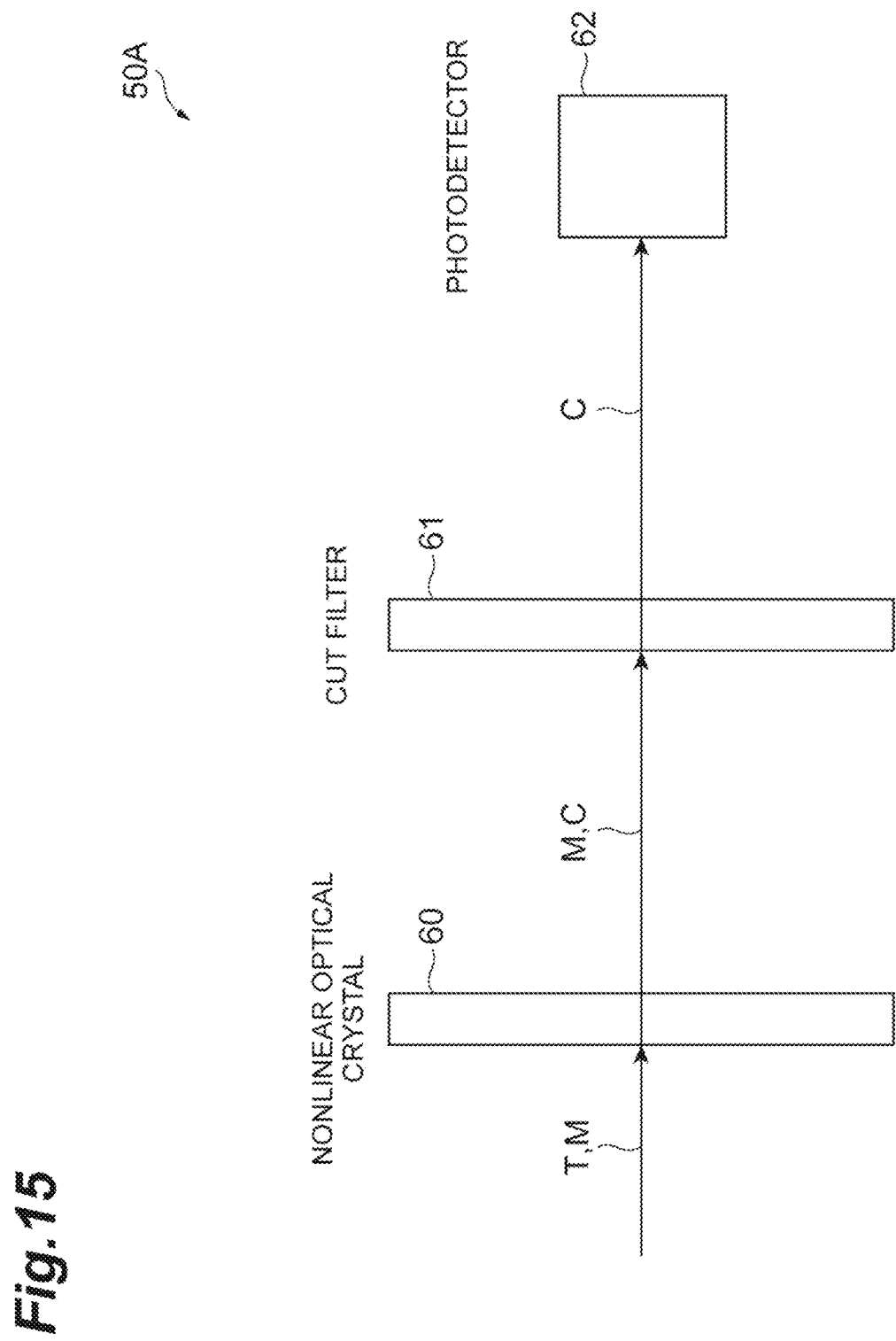

TERAHERTZ WAVE SPECTROSCOPIC MEASUREMENT DEVICE

TECHNICAL FIELD

The present disclosure relates to a terahertz wave spectroscopic measurement device.

BACKGROUND

Examples of a technology regarding a spectroscopic measurement device using terahertz waves include a spectroscopic measurement device described in Japanese Patent No. 5231538. In this spectroscopic measurement device, a terahertz wave generation element that generates terahertz waves is integrally provided on an incidence surface of an internal total reflection prism, and a terahertz wave detection element that detects the terahertz waves is integrally provided on an emission surface of the internal total reflection prism. In this total reflection terahertz measurement device, the terahertz waves are totally reflected by a placement surface for a measurement target provided in the internal total reflection prism so that an evanescent component is generated, and the measurement target is irradiated with the evanescent component so that information on the measurement target is acquired.

Examples of a technology regarding a method of detecting terahertz waves include detection methods described in Non-Patent Document 1 and Non-Patent Document 2. In these detection methods, terahertz waves and probe light having a wavelength different from that of the terahertz waves are incident on a nonlinear crystal, wavelength conversion is performed, and the terahertz waves are indirectly detected on the basis of wavelength converted light. Examples of a light source that simultaneously outputs terahertz waves and probe light include a quantum cascade laser described in Japanese Unexamined Patent Publication No. 2017-33981. This quantum cascade laser is configured to be able to generate first pump light at a first frequency and second pump light at a second frequency due to a light emission transition between sub-bands of electrons, and to generate output light of the terahertz waves at a difference frequency due to difference frequency generation using the first pump light and the second pump light.

[Non-Patent Document 1] Yuma Takida et al., "Nonlinear optical detection of terahertz-wave radiation from resistant tunneling diodes," Optics Express 255, 5389 (2017).

[Non-Patent Document 2] Vladimir V. Komienko et al., "Terahertz continuous wave nonlinear-optical detection without phase-locking between a source and detector," Optics Letters 41, 4075 (2016).

SUMMARY

In general, a thermal detector that is used for detection of terahertz waves directly detects the terahertz waves, but there is a problem that it is difficult to obtain a sufficient response speed of detection. Therefore, in order to realize high-speed detection in a spectroscopic measurement device using terahertz waves, for example, it is conceivable to apply the quantum cascade laser described in Japanese Unexamined Patent Publication No. 2017-33981 to the spectroscopic measurement device described in Japanese Patent No. 5231538, and to combine a scheme of indirectly detecting terahertz waves as described in Non-Patent Documents 1 and 2. However, when these technologies are merely combined, an interaction between the probe light and the measurement target may be a problem. For example, when the evanescent component of the probe light causes an interaction with the measurement target, there is concern that a change in quality or a change in temperature of the measurement target will be induced and affect detection accuracy of the terahertz waves.

The present disclosure has been made in view of such problems, and an object of the present disclosure is to provide a terahertz wave spectroscopic measurement device capable of accurately detecting terahertz waves at a high speed.

A terahertz wave spectroscopic measurement device according to an aspect of the present disclosure includes a light source that emits terahertz waves and probe light having a wavelength different from that of the terahertz waves; an internal total reflection prism including an incidence surface of the terahertz waves, a placement surface on which a measurement target is placed, and an emission surface of the terahertz waves, the internal total reflection prism internally totally reflecting the terahertz waves incident from the incidence surface by means of the placement surface and emitting the terahertz waves from the emission surface; and a terahertz wave detection unit that indirectly detects the terahertz waves emitted from the emission surface using the probe light, wherein the internal total reflection prism includes an avoidance portion on which incidence of the probe light on the measurement target on the placement surface is avoided.

In the terahertz wave spectroscopic measurement device, the terahertz waves emitted from the light source are incident on the inside of the internal total reflection prism from the incidence surface, are totally reflected by the placement surface, are emitted from the emission surface, and are incident on the terahertz wave detection unit. When the terahertz waves are totally reflected by the placement surface, an evanescent component of the terahertz waves is generated on the placement surface. Information on the measurement target is acquired by this evanescent component being incident on the measurement target on the placement surface, and the terahertz waves are indirectly detected using the probe light, thereby enabling high-speed detection of the terahertz waves. On the other hand, the probe light emitted from the light source is incident on the terahertz wave detection unit without being incident on the measurement target due to the avoidance portion. Therefore, since it is possible to suppress occurrence of an interaction between the probe light and the measurement target and suppress induction in the change in quality or the change in temperature of the measurement target, it is possible to accurately detect the terahertz waves.

In the terahertz wave spectroscopic measurement device, the avoidance portion may include an optical branching portion that guides the terahertz waves to the placement surface and does not guide the probe light to the placement surface. Further, in the terahertz wave spectroscopic measurement device, the optical branching portion may include an optical element that reflects the terahertz waves incident on the internal total reflection prism from the incidence surface, toward the placement surface, and transmits the probe light incident on the internal total reflection prism from the incidence surface, toward the emission surface. According to such an aspect, since only the terahertz waves are guided to the placement surface by the light branching portion, it is possible to more reliably suppress the occurrence of the interaction between the probe light and the measurement target on the placement surface.

In the terahertz wave spectroscopic measurement device, the optical branching portion may include an optical element that guides the terahertz waves incident on the internal total reflection prism from the incidence surface, to the emission surface via the placement surface, and reflects the probe light by means of the incidence surface to guide the probe light to the emission surface without being incident on the internal total reflection prism. According to such an aspect, since the optical path of the terahertz waves and the optical path of the probe light are more clearly separated, it is possible to more reliably suppress occurrence of an interaction between the probe light and the measurement target on the placement surface. Further, by preventing the probe light from being incident on the internal total reflection prism, it is possible to suppress occurrence of a deviation of the optical path of the terahertz waves due to a change in temperature of the internal total reflection prism caused by the incidence of the probe light.

In the terahertz wave spectroscopic measurement device, the optical branching portion may include an air gap portion provided in the internal total reflection prism, and a spacing of the air gap portion may be smaller than a penetration depth of an evanescent component of the terahertz waves at an interface with the internal total reflection prism and may be larger than a penetration depth of an evanescent component of the probe light at the interface. When the terahertz waves and the probe light emitted from the light source reach the air gap portion, the evanescent light of each of the terahertz waves and the probe light exist at the interface between the air gap portion and the internal total reflection prism. Here, since a spacing of the air gap portion is smaller than the penetration depth of the evanescent component of the terahertz waves, the terahertz waves reaching the interface are transmitted via the evanescent component penetrated into the air gap portion. On the other hand, since a spacing of the air gap portion is smaller than the penetration depth of the evanescent component of the probe light, the probe light is reflected at the interface. Therefore, the avoidance portion can be realized with a simple configuration by the air gap portion.

In the above terahertz wave spectroscopic measurement device, the avoidance portion includes an optical branching portion that branches, on the placement surface, the terahertz waves and the probe light incident on the internal total reflection prism. Further, in the terahertz wave spectroscopic measurement device, the optical branching portion may include an optical element that is disposed on the placement surface to transmit the terahertz waves and reflect the probe light. In this case, since the optical path of the terahertz waves and the optical path of the probe light in the internal total reflection prism substantially match, it is possible to avoid an increase in a size of the device.

In the terahertz wave spectroscopic measurement device, the optical branching portion may include a condensing lens that condenses the terahertz waves and the probe light on the placement surface, and a metal film that is disposed on the placement surface and has an area smaller than a condensing diameter of the terahertz waves on the placement surface and larger than a condensing diameter of the probe light on the placement surface. In this case, the probe light can be reflected by the metal film disposed on the placement surface, and only the terahertz waves can be selectively incident on the measurement target. Therefore, the avoidance portion can be realized with a simple configuration by the metal film.

In the above terahertz wave spectroscopic measurement device, the optical branching portion may include a spacer that is disposed on the placement surface and forms a spacing smaller than a penetration depth of the evanescent component of the terahertz waves on the placement surface and larger than a penetration depth of the evanescent component of the probe light on the placement surface, between the placement surface and the measurement target. In this case, only the terahertz waves can be selectively incident on the measurement target by the spacer between the placement surface and the measurement target. Therefore, the avoidance portion can be realized with a simple configuration by the spacer.

In the terahertz wave spectroscopic measurement device, optical axes of the terahertz waves and the probe light incident on the incidence surface may be coaxial, and optical axes of the terahertz waves and the probe light emitted from the emission surface may be coaxial. In this case, it is possible to more reliably avoid an increase in a size of the device by sharing the optical paths of the terahertz waves and the probe light.

The terahertz wave spectroscopic measurement device may further include an attenuator that attenuates an intensity of the probe light. In the light source, when an output of the probe light is excessive as compared with an output of the terahertz waves, the intensity of the probe light is attenuated by the attenuator. Accordingly, saturation of the probe light in the terahertz wave detection unit can be prevented. Thus, it is possible to accurately detect the terahertz waves.

According to the present disclosure, it is possible to accurately detect terahertz waves at a high speed.

BRIEF DESCRIPTION OF THE DRAWINGS

FIG. 6 is a configuration diagram illustrating a terahertz wave spectroscopic measurement device according to a first modification example.

FIG. 15 is a configuration diagram illustrating a terahertz wave detection unit according to an eighth modification example.

DETAILED DESCRIPTION

Figure 1:
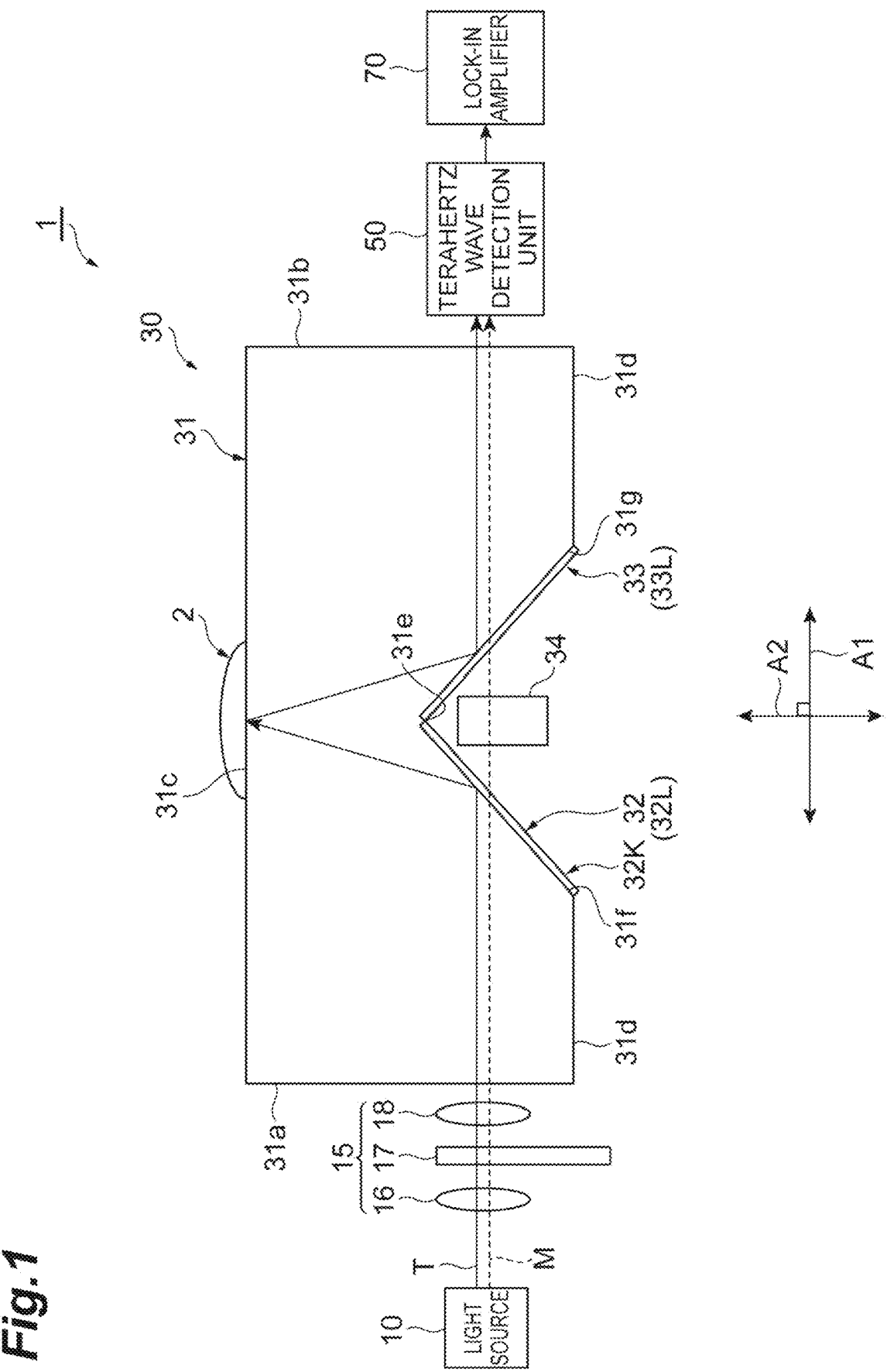
FIG. 1 is a configuration diagram illustrating a terahertz wave spectroscopic measurement device according to an embodiment.

Hereinafter, embodiments of a terahertz wave spectroscopic measurement device according to the present disclosure will be described in detail with reference to the accompanying drawings. In description of the drawings, the same elements are denoted by the same reference numerals, and repeated description will be omitted.

FIG. 1 is a configuration diagram illustrating a terahertz wave spectroscopic measurement device 1 of an embodiment. The terahertz wave spectroscopic measurement device 1 acquires information (for example, an optical constant such as an absorption coefficient or a refractive index) on a measurement target 2 using a total reflection measurement method using terahertz waves T. As illustrated in FIG. 1, the terahertz wave spectroscopic measurement device 1 includes a light source 10, a light modulation unit 15, an internal total reflection prism 30, a terahertz wave detection unit 50, and a lock-in amplifier 70.

The light source 10 emits terahertz waves T, and probe light having a different wavelength from the terahertz waves T. The light source 10 may be, for example, a DFG-QCL light source that emits the terahertz waves T through difference frequency generation (DFG) in a mid-infrared quantum cascade laser (QCL) that oscillates with two wavelengths or may be a distributed feedback (DFB) laser light source that emits the terahertz waves T using a photo mixing method. In the embodiment, a case in which a DFG-QCL light source is used as the light source 10 will be illustrated. In this case, the light source 10 simultaneously emits the terahertz waves T and the mid-infrared light (probe light) M.

The light modulation unit 15 is disposed on an optical path between the light source 10 and the internal total reflection prism 30. The light modulation unit 15 temporally modulates only the terahertz waves T between the terahertz waves T and the mid-infrared light M emitted from the light source 10 with a modulation frequency f1. The light modulation unit 15 has a condensing lens 16, a chopper 17, and a collimating lens 18. The condensing lens 16 is disposed on an optical path between the light source 10 and the chopper 17. The condensing lens 16 condenses the terahertz waves T and the mid-infrared light M emitted from the light source 10 on the chopper 17.

Figure 2:
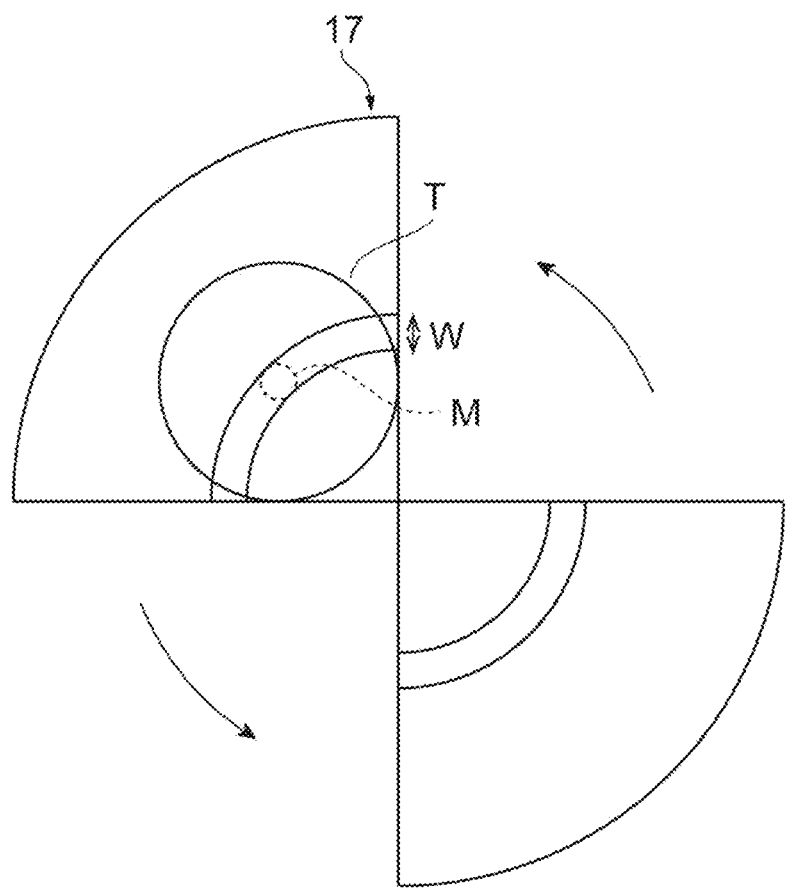
FIG. 2 is a plan view of a chopper as viewed from a light source side.

The chopper 17 repeatedly passes and blocks, at the modulation frequency f1, only the terahertz waves T between the terahertz waves T and the mid-infrared light M condensed by the condensing lens 16. FIG. 2 is a plan view of the chopper 17 as viewed from the light source 10 side. The chopper 17 is configured, for example, as a rotary disk in which a passing portion and a blocking portion are alternately disposed. Here, the passing portion passes the terahertz waves T and the mid-infrared light M.

As illustrated in FIG. 2, a gap having a width w is formed in the blocking portion of the chopper 17. This gap is provided on an optical path of the terahertz waves T and the mid-infrared light M condensed by the condensing lens 16, and is formed in a circumferential direction of the blocking portion. The width w is equal to or slightly larger than a condensing diameter (for example, 10 μm) of the mid-infrared light M. On the other hand, the width w is smaller than a condensing diameter (for example, 300 μm) of the terahertz waves T.

In general, a magnitude of a condensing diameter of light depends on a magnitude of a wavelength. Since a wavelength region (for example, 100 μm to 1 mm) of the terahertz waves T are much wider than a wavelength region (for example, 4 μm to 10 μm) of the mid-infrared light M, a condensing diameter of the terahertz waves T are much larger than a converging diameter of the mid-infrared light M. Therefore, by the width w having the above-described magnitude, most of the terahertz waves T other than a part thereof is blocked in a blocking portion of the chopper 17, whereas the mid-infrared light M is passed without being blocked. As a result, in the chopper 17, most of the terahertz waves T are repeatedly passed and blocked at the modulation frequency f1, whereas the mid-infrared light M is passed without being repeatedly passed and blocked.

Referring back to FIG. 1. The collimating lens 18 is disposed on an optical path between the chopper 17 and the internal total reflection prism 30. The collimating lens 18 converts the terahertz waves T and the mid-infrared light M that have passed through the chopper 17 into collimated light and then emits the collimated light to the internal total reflection prism 30.

The internal total reflection prism 30 is disposed on an optical path between the light source 10 and the terahertz wave detection unit 50 (specifically, on the optical path between the light modulation unit 15 and the terahertz wave detection unit 50). The internal total reflection prism 30 includes a main body portion 31, an avoidance portion 32K, and an optical combination portion 33L. The main body portion 31 has, for example, a substantially rectangular parallelepiped shape. A V-shaped groove 31e to be described below is provided in a width direction of the main body portion 31 (that is, in a depth direction of a paper in FIG. 1) in a center portion on a bottom surface side of the main body portion 31. The main body portion 31 is formed of a material having a high transmission property to the terahertz waves T and the mid-infrared light M that are emitted from the light source 10. An example of a constituent material of the main body portion 31 may include a cycloolefin polymer, polyethylene, MgO, or silicon. The main body portion 31 includes an incidence surface 31a, an emission surface 31b, a placement surface 31c, and a bottom surface 31d.

The incidence surface 31a and the emission surface 31b face each other in a first direction A1. The terahertz waves T and the mid-infrared light M emitted from the light source 10 are incident on the incidence surface 31a. An optical axis of the terahertz waves T and an optical axis of the mid-infrared light M incident on the incidence surface 31a are coaxial in the first direction A1.

The emission surface 31b emits the terahertz waves T and the mid-infrared light M incident on the main body portion 31 from the incidence surface 31a. The optical axis of the terahertz waves T and the optical axis of the mid-infrared light M emitted from the emission surface 31b are coaxial in the first direction A1. In the example of FIG. 1, the optical axis of the terahertz waves T and the optical axis of the mid-infrared light M incident on the incidence surface 31a and the optical axis of the terahertz waves T and the optical axis of the mid-infrared light M emitted from the emission surface 31b are located on the same straight line.

The placement surface 31c and the bottom surface 31d face each other in a second direction A2 orthogonal to the first direction A1. The placement surface 31c is provided on an optical path between the incidence surface 31a and the emission surface 31b. In the example of FIG. 1, a top surface of the main body portion 31 constitutes the placement surface 31c. The measurement target 2 that is a target of measurement of various optical constants such as a refractive index, a dielectric constant, or an absorption coefficient, for example, is placed on the placement surface 31c. In the placement surface 31c, the terahertz waves T incident on the main body portion 31 from the incidence surface 31a are totally reflected. Due to this total reflection, the evanescent component of the terahertz waves T are incident on the measurement target 2 on the placement surface 31c.

A V-shaped groove 31e (a groove having a V-shaped cross-section) is formed upwardly in the width direction of the main body portion 31 on the bottom surface 31d. A top portion of the V-shaped groove 31e substantially matches a placement position of the measurement target 2 on the placement surface 31c, and includes an inner surface 31f located on the incidence surface 31a side and an inner surface 31g located on the emission surface 31b side. In the embodiment, the inner surface 31f and the inner surface 31g are provided symmetrically with the top portion of the V-shaped groove 31e interposed therebetween. The inner surface 31f is located on an optical path between the incidence surface 31a and the placement surface 31c and is inclined with respect to the incidence surface 31a and the placement surface 31c. The inner surface 31g is located on an optical path between the placement surface 31c and the emission surface 31b and is inclined with respect to the placement surface 31c and the emission surface 31b.

In the avoidance portion 32K, incidence of the mid-infrared light M on the measurement target 2 on the placement surface 31c is avoided. The avoidance portion 32K includes an optical branching portion 32L that guides the terahertz waves T to the placement surface 31c and does not guide the mid-infrared light M to the placement surface 31e. More specifically, the optical branching portion 32L is configured of an optical element 32 disposed on the inner surface 31f. The optical element 32 is, for example, a dielectric multilayer film functioning as an antireflection film with respect to the mid-infrared light M. The optical element 32 reflects the terahertz waves T using the inner surface 31f to guide the terahertz waves T to the placement surface 31c, and transmits the mid-infrared light M from the inner surface 31f into the V-shaped groove 31e.

The optical combination portion 33L combines the terahertz waves T totally reflected by the placement surface 31c with the mid-infrared light M passing through the V-shaped groove 31e. More specifically, the optical combination portion 33L is configured of an optical element 33 disposed on the inner surface 31g. The optical combination portion 33L is, for example, a dielectric multilayer film functioning as an anti-reflection film with respect to the mid-infrared light M, similar to the optical element 32. The optical combination portion 33L reflects the terahertz waves T from the placement surface 31c using the inner surface 31g to guide the terahertz waves T to the emission surface 31b and transmits the mid-infrared light M into the main body portion 31 from the inner surface 31g to guide the mid-infrared light M to the emission surface 31b.

Further, in the embodiment, an attenuator 34 is provided on the optical path of the mid-infrared light M in the V-shaped groove 31e. The attenuator 34 attenuates the intensity of the mid-infrared light M to adjust the intensity of the mid-infrared light M relative to the intensity of the terahertz waves T. An attenuation rate of the attenuator 34 with respect to the mid-infrared light M may be constant or may be variable. When the attenuation rate of the attenuator 34 is constant, the attenuator 34 is formed of a material such as Si, Ge, quartz, sapphire or the like. The attenuator 34 may be formed of, for example, a resin in which a metal powder, black carbon or the like has been dispersed. When the attenuation rate of the attenuator 34 is variable, the attenuator 34 may be formed of, for example, two polarizers. In this case, it is possible to adjust the attenuation rate of the mid-infrared light M by rotating one of the two polarizers with respect to the other polarizer.

In the internal total reflection prism 30 having the above configuration, the terahertz waves T emitted from the light source 10 are incident on the inside of the main body portion 31 from the incidence surface 31a, are reflected by the inner surface 31f, and then are incident on the placement surface 31c. The terahertz waves T are totally reflected by the placement surface 31c, are reflected by the inner surface 31g, and then are emitted toward the terahertz wave detection unit 50 from the emission surface 31b.

On the other hand, the mid-infrared light M emitted from the light source 10 is incident on the inside of the main body portion 31 from the incidence surface 31a coaxially with the terahertz waves T, is transmitted through the inner surface 31f, and is guided into the V-shaped groove 31e. Thereafter, the mid-infrared light M is incident on the inside of the main body portion 31 again via the attenuator 34 from the inner surface 31g, and is emitted toward the terahertz wave detection unit 50 from the emission surface 31b coaxially with the terahertz waves T.

Figure 3:
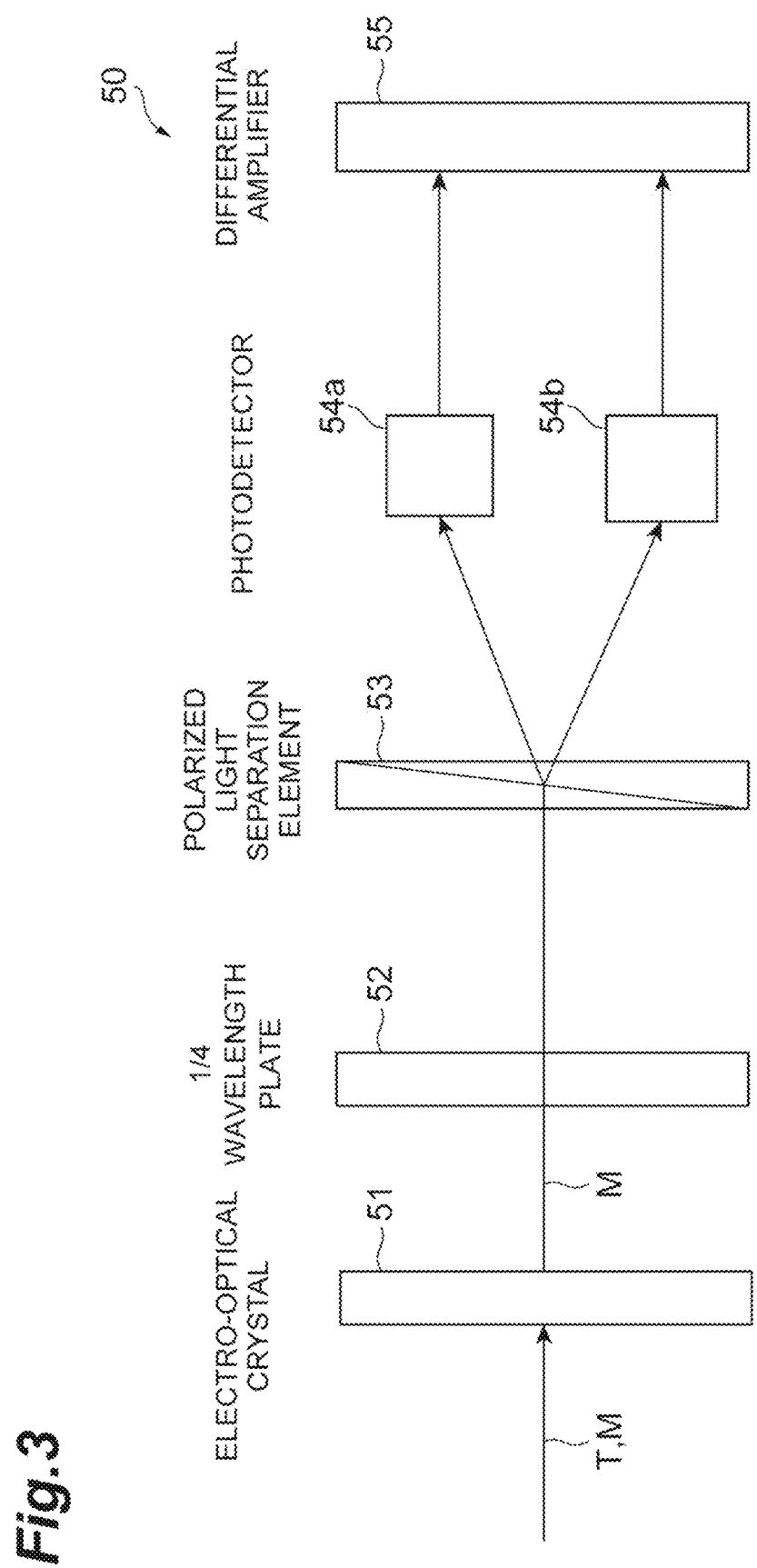
FIG. 3 is a configuration diagram illustrating a terahertz wave detection unit.

FIG. 3 is a configuration diagram illustrating the terahertz wave detection unit 50. As illustrated in FIG. 3, the terahertz wave detection unit 50 includes an electro-optical crystal 51, a ¼ wavelength plate 52, a polarized light separation element 53, photodetectors 54a and 54b, and a differential amplifier 55. The terahertz waves T and the mid-infrared light M emitted from the emission surface 31b are simultaneously incident on the electro-optical crystal 51.

When the terahertz waves T and the mid-infrared light M are simultaneously incident on the electro-optical crystal 51, birefringence is induced by a Pockels effect as the terahertz waves T propagate. The electro-optical crystal 51 changes a polarization state of the mid-infrared light M according to birefringence and emits the mid-infrared light M of which the polarization state has changed. Since the amount of birefringence at this time depends on an electric field intensity of the terahertz waves T, the amount of change in the polarization state of the mid-infrared light M in the electro-optical crystal 51 depends on the electric field intensity of the terahertz waves T. Therefore, it becomes possible to detect the terahertz waves T by detecting the amount of change in the polarization state of the mid-infrared light M.

The ¼ wavelength plate 52 is disposed on an optical path between the electro-optical crystal 51 and the polarized light separation element 53. The ¼ wavelength plate 52 adjusts the polarization state of the mid-infrared light M emitted from the electro-optical crystal 51. The polarized light separation element 53 is, for example, a Wollaston prism, and separates the middle-infrared light M that has passed through the ¼ wavelength plate 52 into two mutually orthogonal polarized light components and outputs the polarized light components. Each of the photodetectors 54a and 54b include, for example, photodiodes, and detect powers of the two polarized light components of the mid-infrared light M separated by the polarized light separation element 53, and output electrical signals having values according to the detected powers. It should be noted that each of the photodetectors 54a and 54b have detection sensitivity to the mid-infrared light M, but do not have detection sensitivity to the terahertz waves T. The differential amplifier 55 is electrically connected to the photodetectors 54a and 54b. The electric signals respectively output from the photodetectors 54a and 54b are input to the differential amplifier 55. The differential amplifier 55 detects a difference between the electric signals, and outputs a electric signal indicating the difference to the lock-in amplifier 70 (see FIG. 1). The lock-in amplifier 70 synchronously detects the electric signal output from the differential amplifier 55 at a repetition frequency (a modulation frequency) f1 of passing and blocking of the terahertz waves T in the light modulation unit 15. The signal output from the lock-in amplifier 70 has a value that depends on the electric field intensity of the terahertz waves T.

Thus, by detecting the change in the polarization state of the mid-infrared light M in the electro-optical crystal 51, an electric field amplitude of the terahertz waves T are indirectly detected using the detected mid-infrared light M, and information on the measurement target 2 is acquired. It is desirable for optical path lengths of the terahertz waves T and the mid-infrared light M from the light source 10 to reach to the terahertz wave detection unit 50 to match each other in order to improve the detection efficiency of the terahertz waves T when the light source 10 is a pulsed light source.

Effects obtained by the terahertz wave spectroscopic measurement device 1 of the embodiment will be described together with problems of the comparative example. Methods of detecting the terahertz waves are roughly classified into a method of directly detecting the terahertz waves using a thermal detector and a method of indirectly detecting a terahertz waves by converting the terahertz waves into light. In the method of directly detecting the terahertz waves, the terahertz waves are generally detected using thermal detection. However, there is a problem that a response speed of the thermal detector is much slower than that of a quantum photodetector. Therefore, in the method of directly detecting the terahertz waves, there is a problem that it is difficult to detect the terahertz waves at high speed.

Therefore, when high-speed detection in the terahertz wave spectroscopic measurement device is realized, it is conceivable to apply a DFG-QCL light source (see, for example, Japanese Patent No. 5231538) to this terahertz wave spectroscopic measurement device and combine the scheme of indirectly detecting a terahertz waves (see, for example, Non-Patent Document 1 and Non-Patent Document 2). However, with such a terahertz wave spectroscopic measurement device, an interaction between the mid-infrared light and the measurement target may be a problem.

Figure 4:
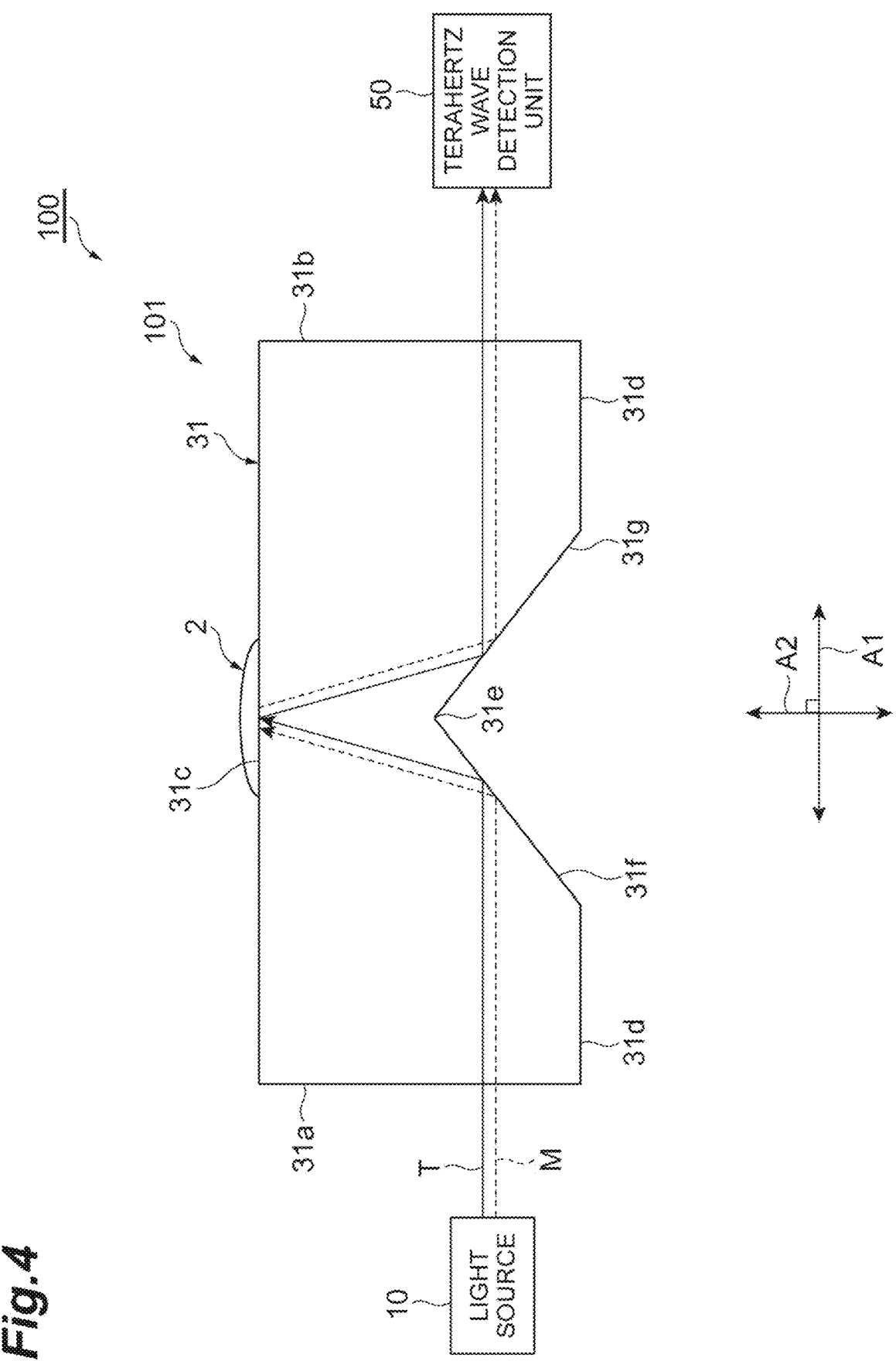
FIG. 4 is a configuration diagram illustrating a terahertz wave spectroscopic measurement device according to a first comparative example.

FIG. 4 is a configuration diagram illustrating a terahertz wave spectroscopic measurement device 100 as a first comparative example. The terahertz wave spectroscopic measurement device 100 is a combination of a DFG-QCL light source and a scheme of indirectly detecting terahertz waves T. The terahertz wave spectroscopic measurement device 100 is different from the terahertz wave spectroscopic measurement device 1 in that an internal total reflection prism 101 does not include the optical element 32 and the optical element 33.

In the terahertz wave spectroscopic measurement device 100, a terahertz waves T and a mid-infrared light M emitted from a light source 10 are incident on the inside of the main body portion 31, are totally reflected on a placement surface 31c via an inner surface 31f, are emitted from an emission surface 31b via an inner surface 31g, and then, are incident on the terahertz wave detection unit 50. Here, when the terahertz waves T and the mid-infrared light M are totally reflected on the placement surface 31c, an evanescent component of the terahertz waves T and an evanescent component of the mid-infrared light M occur on the placement surface 31c. In this case, when the evanescent component of the mid-infrared light M is incident on the measurement target 2, the evanescent component causes an interaction with the measurement target 2. Accordingly, there is concern that a change in quality or a change in temperature of the measurement target 2 is induced and the detection accuracy of the terahertz waves T are affected. Further, when a change in temperature in the main body portion 31 is induced due to the incidence of the mid-infrared light M, there is concern that a refractive index in the main body portion 31 is modulated and a deviation occurs in optical paths of the terahertz waves T and the mid-infrared light M propagating inside the main body portion 31.

Figure 5:
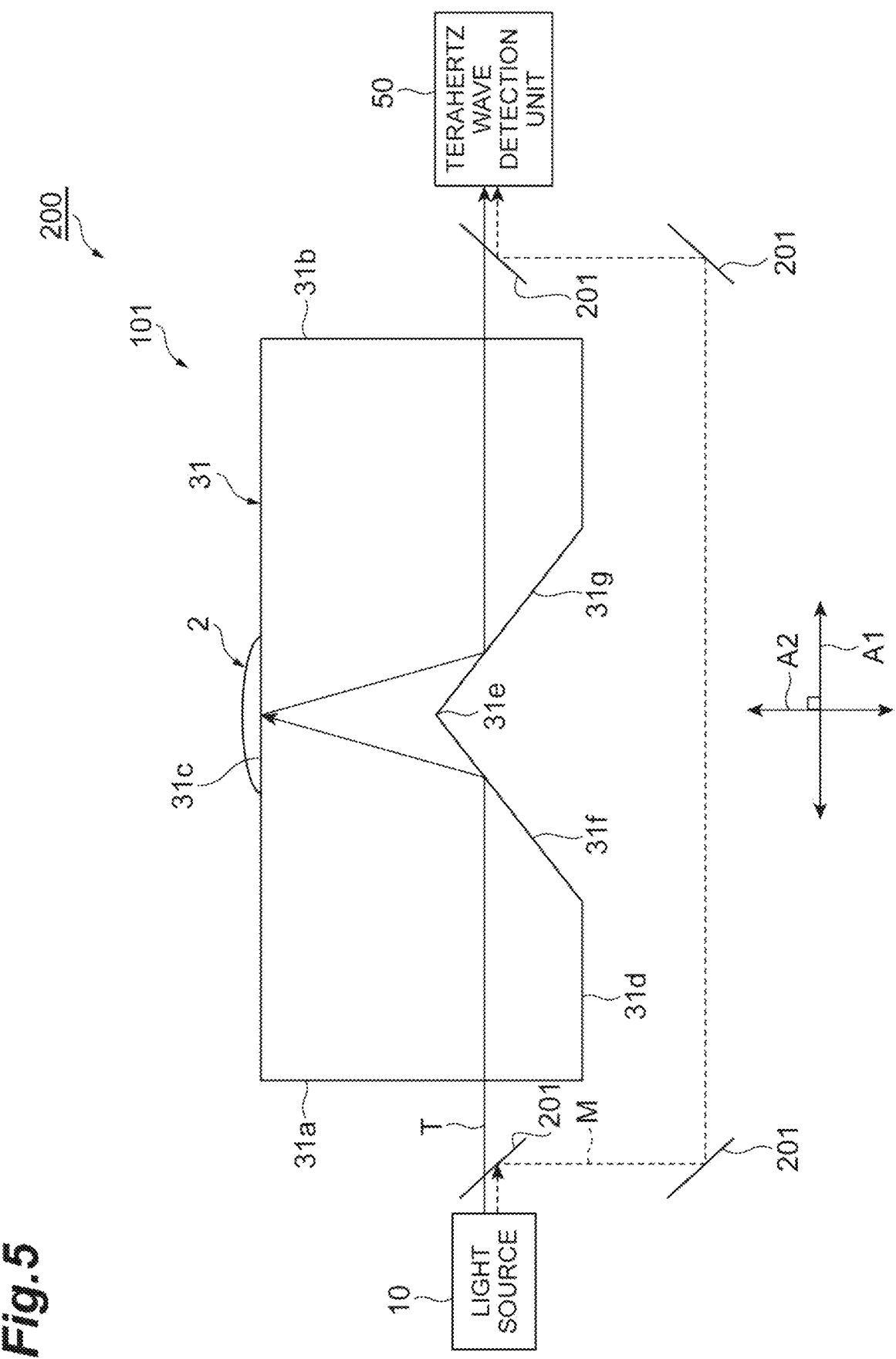
FIG. 5 is a configuration diagram illustrating a terahertz wave spectroscopic measurement device according to a second comparative example.

FIG. 5 is a configuration diagram illustrating a terahertz wave spectroscopic measurement device 200 as a second comparative example. A terahertz wave spectroscopic measurement device 200 includes a plurality of mirrors 201, in addition to the configuration of the terahertz wave spectroscopic measurement device 100. Each mirror 201 guides the mid-infrared light M to the terahertz wave detection unit 50 outside the main body portion 31 so that the mid-infrared light M emitted from the light source 10 is not incident on the inside of the main body portion 31. As in the terahertz wave spectroscopic measurement device 200, it is conceivable to avoid incidence of the mid-infrared light M on the measurement target 2 using the plurality of mirrors 201.

However, when the plurality of mirrors 201 are provided outside the main body portion 31 as described above, it is easy for a size of the device to be increased. In addition, when the plurality of mirrors 201 are used in this manner, it is easy for an optical axis deviation of each mirror 201 to occur, and as a result, there is concern that the detection accuracy of the terahertz waves T may be lowered. It is conceivable to cut the mid-infrared light M emitted from the light source 10 using a filter or the like before the mid-infrared light M is incident on the main body portion 31. However, in this case, since the light source 10 emitting the mid-infrared light M is separately necessary, a size of the device is likely to increase.

On the other hand, in the embodiment, the mid-infrared light M emitted from the light source 10 is incident on the terahertz wave detection unit 50 without being incident on the measurement target 2 due to the optical element 32. Specifically, the optical element 32 reflects the terahertz waves T incident on the main body portion 31 from the incidence surface 31a, toward the placement surface 31c, and transmits the mid-infrared light M incident on the main body portion 31 from the incidence surface 31a, toward the emission surface 31b, such that only the terahertz waves T are guided to the placement surface 31c. Therefore, since occurrence of an interaction between the mid-infrared light M and the measurement target 2 can be suppressed and induction of a change in quality or a change in temperature of the measurement target 2 can be suppressed, it is possible to accurately detect the terahertz waves T. Further, an optical path between the optical element 32 and the optical element 33 is designed so that a center position of the optical paths of the terahertz waves T and the mid-infrared light M in the first direction A1 is disposed on a reference axis L, and the optical paths are symmetrical with respect to the reference axis L. Accordingly, even when the optical path of the mid-infrared light M has been shifted by the optical element 32 and the optical element 33, the optical axes of the terahertz waves T and the mid-infrared light M incident on the optical element 32 and the optical axes of the terahertz waves T and the mid-infrared light M emitted from the optical element 33 can be aligned on the same straight line. Accordingly, optical axis adjustment is facilitated.

As in the embodiment, the optical axes of the terahertz waves T and the mid-infrared light M incident on the incidence surface 31a may be coaxial, and the optical axes of the terahertz waves T and the mid-infrared light M emitted from the emission surface 31b may be coaxial. In this case, it is possible to more reliably avoid an increase in a size of the device by sharing the optical paths of the terahertz waves T and the mid-infrared light M.

As in the embodiment, the terahertz wave spectroscopic measurement device 1 may include the attenuator 34 that attenuates the intensity of the mid-infrared light M. In the light source 10, when an output of the mid-infrared light M is excessive as compared with an output of the terahertz waves T, the intensity of the mid-infrared light M is attenuated by the attenuator 34. Accordingly, saturation of the mid-infrared light M in the terahertz wave detection unit 50 can be prevented. Thus, it is possible to accurately detect the terahertz waves T.

First Modification Example

FIG. 6 is a configuration diagram illustrating a terahertz wave spectroscopic measurement device 1A according to a first modification example of the embodiment. A difference between the embodiment and the first modification example is a configuration of the internal total reflection prism. The internal total reflection prism 30A of the first modification example further includes a prism portion 35 faulted integrally with the main body portion 31. The prism portion 35 has a triangular cross-section shape corresponding to a shape of the V-shaped groove 31e of the main body portion 31 and is fitted to the V-shaped groove 31e. The prism portion 35 is formed of the same material as the main body portion 31. The attenuator 34 of the embodiment is provided on the optical path of the mid-infrared light M inside the prism portion 35.

The prism portion 35 includes an inclined surface 35a facing the inner surface 31f, an inclined surface 35b facing the inner surface 31g, and a bottom surface 35c extending along the bottom surface 31d. The inclined surface 35a is inclined along the inner surface 31f, and the inclined surface 35b is inclined along the inner surface 31g. In one example, the inclined surface 35a is parallel to the inner surface 31f, and the inclined surface 35b is parallel to the inner surface 31g.

The optical branching portion 32L of the internal total reflection prism 30A is configured of an optical element 32A in place of the optical element 32 and the optical combination portion 33L is configured of an optical element 33A in place of the optical element 33. The optical element 32A is disposed between the inner surface 31f and the inclined surface 35a. The optical element 32A is, for example, a band pass filter that transmits only the mid-infrared light M. The optical element 32A reflects the terahertz waves T on the inner surface 31f to guide the terahertz waves T to the placement surface 31c, and transmits the mid-infrared light M to be guided into the prism portion 35 from the inclined surface 35a.

The optical element 33A is disposed between the inner surface 31g and the inclined surface 35b. The optical element 33A is, for example, a band pass filter that transmits only the mid-infrared light M, similar to the optical element 32A. The optical element 33A reflects the terahertz waves T from the placement surface 31c by means of the inner surface 31g to guide the terahertz waves T to the emission surface 31b, and transmits the mid-infrared light M into the main body portion 31 from the inner surface 31g to guide the mid-infrared light M to the emission surface 31b.

In the internal total reflection prism 30A of the first modification example, the terahertz waves T emitted from the light source 10 is incident on the inside of the main body portion 31 from the incidence surface 31a, is reflected by the inner surface 31f, and then, is incident on the placement surface 31c. The terahertz waves T are totally reflected by the placement surface 31c, is reflected by the inner surface 31g, and then, is emitted toward the terahertz wave detection unit 50 from the emission surface 31b.

On the other hand, the mid-infrared light M emitted from the light source 10 is incident on the inside of the main body portion 31 from the incidence surface 31a coaxially with the terahertz waves T, is transmitted through the optical element 32A, and is incident on the prism portion 35 from the inclined surface 35a. After the mid-infrared light M is incident on the prism portion 35, the mid-infrared light M is transmitted through the optical element 33A via the attenuator 34, and is incident on the inside of the main body portion 31 again from the inner surface 31g. Thereafter, the mid-infrared light M is emitted toward the terahertz wave detection unit 50 from the emission surface 31b coaxially with the terahertz waves T. In such an aspect, since only the terahertz waves T are guided to the placement surface 31c by the optical element 32A, it is possible to achieve the same effects as in the embodiment.

Figure 7A:
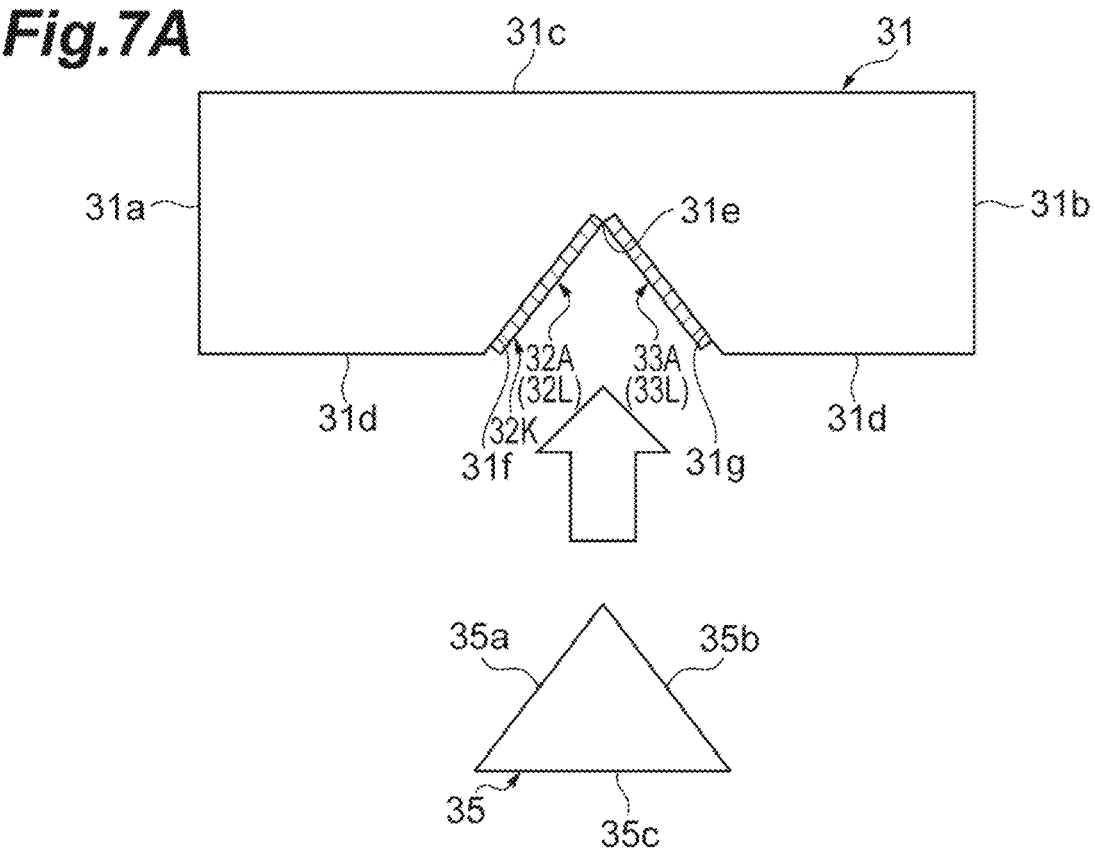
FIGS. 7A and 7B are diagrams illustrating a method of forming optical elements illustrated in FIG. 6.
Figure 7B:
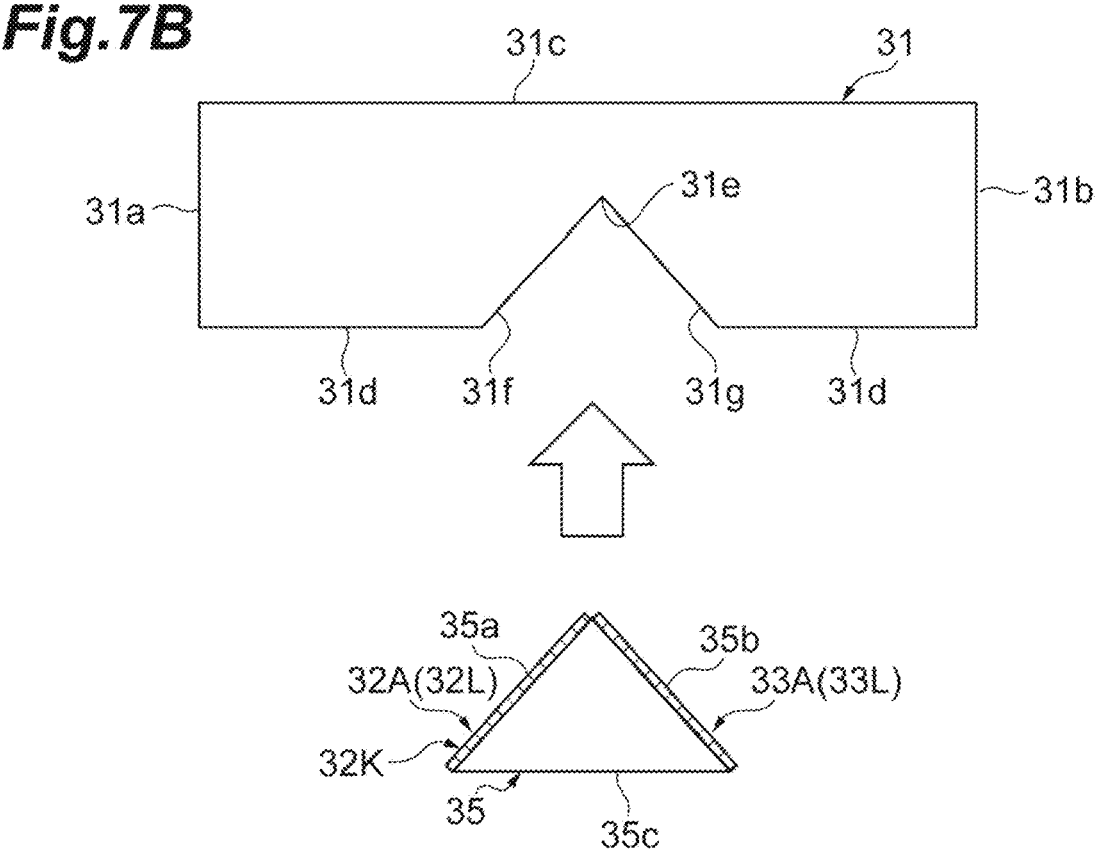

When the internal total reflection prism 30A of the first modification example is manufactured, the main body portion 31 and the prism portion 35 are manufactured separately, the optical element 32A and the optical element 33A are formed, and then, the main body portion 31 and the prism portion 35 are integrally formed. The optical element 32A and the optical element 33A may be formed in advance on the main body portion 31 side or may be formed in advance on the prism portion 35 side. FIGS. 7A and 7B are diagrams illustrating a method of forming the optical element 32A and the optical element 33A. FIG. 7A illustrates an example in which the optical element 32A and the optical element 33A are formed in the V-shaped groove 31e of the main body portion 31. In this case, the optical element 32A and the optical element 33A are formed, for example, on the inner surface 31f and the inner surface 31g of the V-shaped groove 31e through metal vapor deposition, respectively. FIG. 7B illustrates an example in which the optical element 32A and the optical element 33A are formed on the prism portion 35. In this case, the optical element 32A and the optical element 33A are formed, for example, on the inclined surface 35a and the inclined surface 35b of the prism portion 35 through metal vapor deposition, respectively.

Second Modification Example

Figure 8:
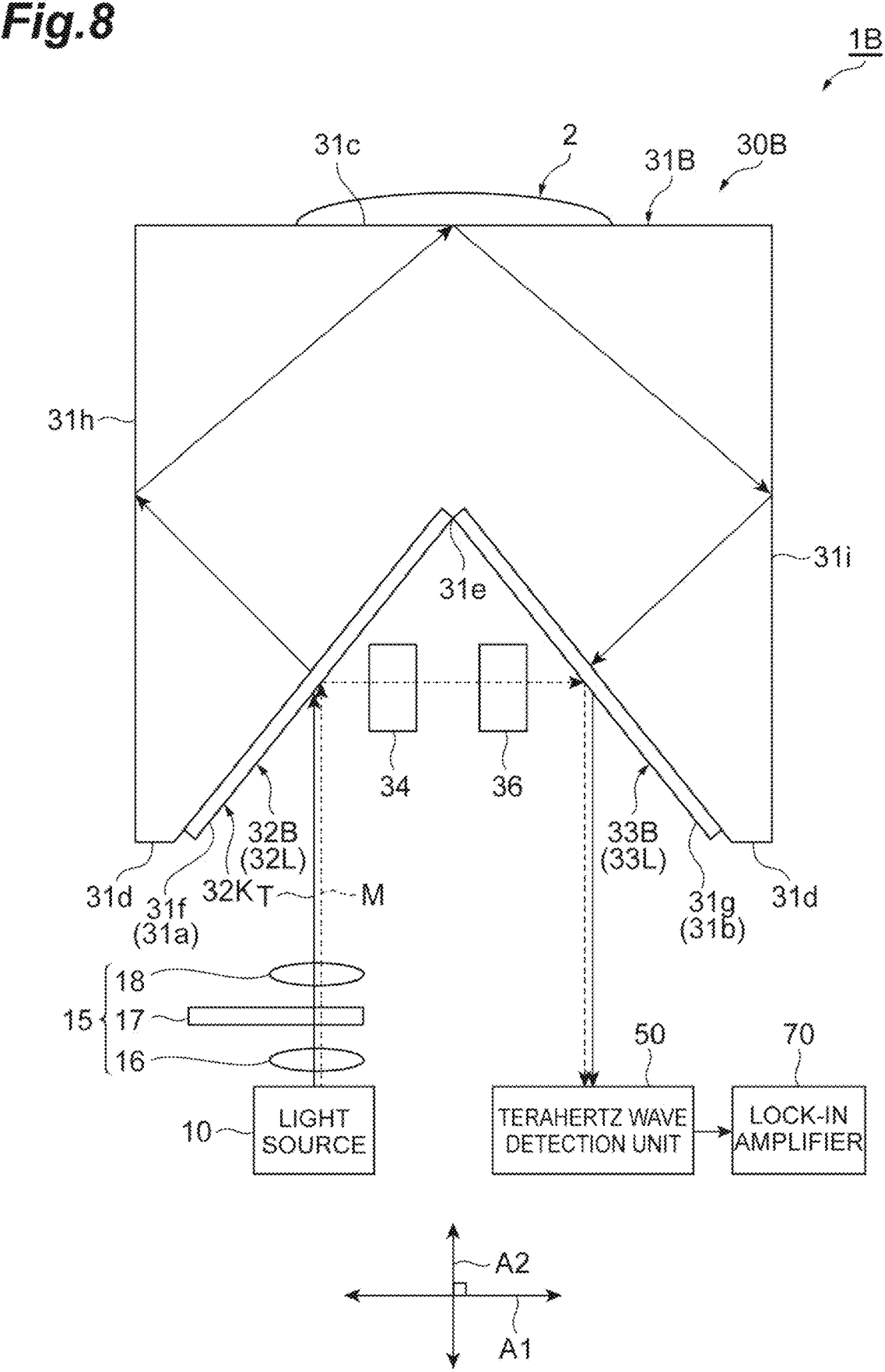
FIG. 8 is a configuration diagram illustrating a terahertz wave spectroscopic measurement device according to a second modification example.

FIG. 8 is a configuration diagram illustrating a terahertz wave spectroscopic measurement device 1B according to a second modification example of the embodiment. A difference between the embodiment and the second modification example is a configuration of the internal total reflection prism. The internal total reflection prism 30B of the second modification example includes a main body portion 31B in place of the main body portion 31. The main body portion 31B further includes a side surface 31h and a side surface 31i facing each other in the first direction A1. The side surface 31h is located on an optical path between the incidence surface 31a and the placement surface 31c. The side surface 31i is located on an optical path between the placement surface 31c and the emission surface 31b. In the main body portion 31B, the inner surface 31f is the incidence surface 31a, and the inner surface 31g is the emission surface 31b. In the second modification example, an optical axis of the terahertz waves T and an optical axis of the mid-infrared light M incident on the incidence surface 31a are along the second direction A2, and the optical axis of the terahertz waves T and the optical axis of the mid-infrared light M emitted from the emission surface 31b are along the second direction A2.

In the second modification example, the optical branching portion 32L of the internal total reflection prism 30B is configured of an optical element 32B in place of the optical element 32, and the optical combination portion 33L is configured of an optical element 33B in place of the optical element 33. The optical element 32B is disposed on the inner surface 31f (that is, the incidence surface 31a). The optical element 32B is, for example, a Z-cut quartz crystal or a band pass filter that transmits only the terahertz waves T. The optical element 32B transmits the terahertz waves T into the main body portion 31B from the inner surface 31f to guide the terahertz waves T to the placement surface 31c, and reflects the mid-infrared light M by means of the inner surface 31f to guide the mid-infrared light M into the V-shaped groove 31e.

The optical element 33B is disposed on the inner surface 31g (that is, the emission surface 31b). The optical element 33B is, for example, a Z-cut quartz crystal or a band pass filter that transmits only the terahertz waves T, similar to the optical element 32B. The optical element 33B transmits the terahertz waves T from the placement surface 31c to guide the terahertz waves T to the terahertz wave detection unit 50 from the inner surface 31f, and reflects the mid-infrared light M by means of the inner surface 31g to guide the mid-infrared light M to the terahertz wave detection unit 50.

In the second modification example, a cut filter 36 is further provided on the optical path of the mid-infrared light M in the V-shaped groove 31e in addition to the attenuator 34. Specifically, the cut filter 36 is provided on the optical path between the attenuator 34 and the inner surface 31g in the V-shaped groove 31e. The cut filter 36 has a function of transmitting only the mid-infrared light M, and cuts a part of the terahertz waves T reflected by the inner surface 31f. Examples of a material of the cut filter 36 include ZnSe, ZnS, and KBr.

When the optical element 32B is formed of a Z-cut quartz, most of the terahertz waves T are transmitted through the inner surface 31f, but a part of the terahertz waves T may be reflected. Since a part of the terahertz waves T reflected by the inner surface 31f is not incident on the measurement target 2, the part is a component unnecessary for the detection of the terahertz waves T. Therefore, by providing the cut filter 36 and cutting this unnecessary component, it is possible to improve the detection accuracy of the terahertz waves T. When the part of the terahertz waves T reflected by the inner surface 31f is small enough to be ignored relative to the transmitted light, the cut filter 36 may not be provided.

In the internal total reflection prism 30B as described above, the terahertz waves T emitted from the light source 10 is transmitted through the optical element 32B from the inner surface 31f, is reflected by the side surface 31h, and is incident on the placement surface 31c. The terahertz waves T are totally reflected by the placement surface 31c, is reflected by the side surface 31i, and then, is transmitted through the optical element 33B toward the terahertz wave detection unit 50. On the other hand, the mid-infrared light M emitted coaxially with the terahertz waves T from the light source 10 is reflected by the inner surface 31f, passes through the attenuator 34 and the cut filter 36 in the V-shaped groove 31e, and then, is reflected toward the terahertz wave detection unit 50 by the inner surface 31g.

In such an aspect, since only the terahertz waves T are guided to the placement surface 31c by the optical element 32B, it is possible to achieve the same effects as in the embodiment. Further, according to such an aspect, since the optical path of the terahertz waves T and the optical path of the mid-infrared light M are more clearly separated, it is possible to more reliably suppress occurrence of an interaction between the mid-infrared light M in the placement surface 31c and the measurement target 2. Further, by preventing the mid-infrared light M from being incident on the internal total reflection prism 30B, it is possible to suppress occurrence of a deviation of the optical path of the terahertz waves T due to a change in temperature of the internal total reflection prism 30B.

Third Modification Example

Figure 9:
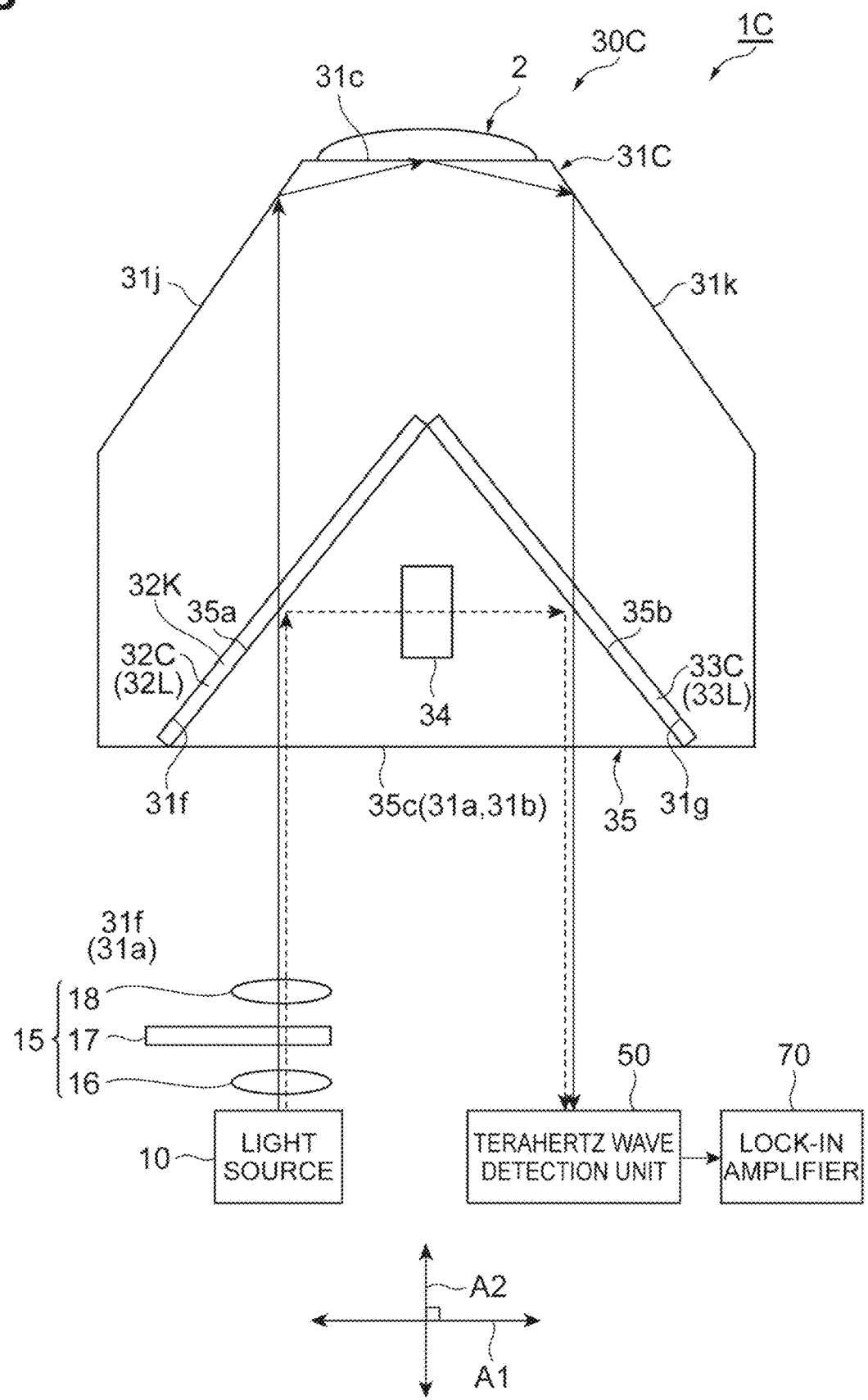
FIG. 9 is a configuration diagram illustrating a terahertz wave spectroscopic measurement device according to a third modification example.

FIG. 9 is a configuration diagram illustrating a terahertz wave spectroscopic measurement device 1C according to a third modification example of the embodiment. A difference between the embodiment and the third modification example is a configuration of the internal total reflection prism. An internal total reflection prism 30C of the third modification example includes a main body portion 31C in place of the main body portion 31. The internal total reflection prism 30C further includes a prism portion 35 (see FIG. 6) formed integrally with the main body portion 31C. The main body portion 31C further includes side faces 31j and side faces 31k facing each other in the first direction A1. The side surface 31j is located on an optical path between the bottom surface 35c of the prism portion 35 and the placement surface 31c and is inclined with respect to the bottom surface 35c and the placement surface 31c. The side surface 31k is located on an optical path between the placement surface 31c and the bottom surface 35c and is inclined with respect to the placement surface 31c and the bottom surface 35c. In the third modification example, one side of the bottom surface 35c of the prism portion 35 is the incidence surface 31a, and the other side is the emission surface 31b. In the third modification example, an optical axis of the terahertz waves T and an optical axis of the mid-infrared light M incident on the incidence surface 31a are along the second direction A2, and an optical axis of the terahertz waves T and an optical axis of the mid-infrared light M emitted from the emission surface 31b are along the second direction A2.

The optical branching portion 32L of the internal total reflection prism 30C is configured of an air gap portion 32C in place of the optical element 32 and the optical combination portion 33L is configured of an air gap portion 33C in place of the optical element 33. The air gap portion 32C is provided inside the internal total reflection prism 30C. Specifically, the air gap portion 32C is provided between the inclined surface 35a and the inner surface 31f. The air gap portion 32C transmits the terahertz waves T into the main body portion 31B from the inclined surface 35a (that is, an interface between the air gap portion 32C and the prism portion 35) to guide the terahertz waves T to the placement surface 31c, and reflects the mid-infrared light M by means of the inclined surface 35a to guide the mid-infrared light M into the prism portion 35.

Figure 10:
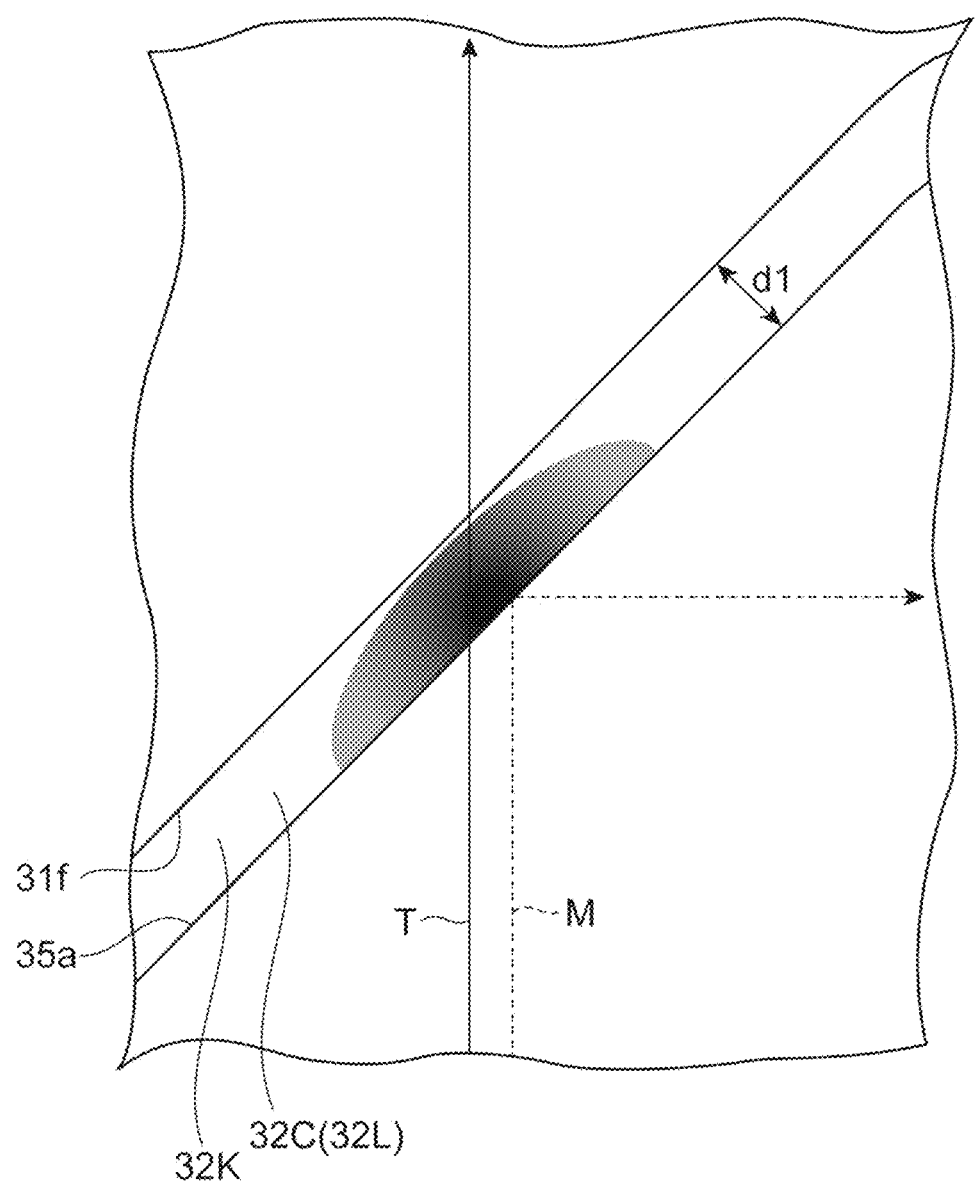
FIG. 10 is an enlarged view illustrating an air gap portion illustrated in FIG. 9.

FIG. 10 is an enlarged view illustrating the air gap portion 32C illustrated in FIG. 9. As illustrated in FIG. 10, a spacing of the air gap portion 32C (that is, a distance between the inclined surface 35a and the inner surface 31f) is set to a distance d1. The distance d1 is smaller than a penetration depth of the evanescent component of the terahertz waves T on the inclined surface 35a and larger than the penetration depth of the evanescent component of the mid-infrared light M on the inclined surface 35a. Here, when a wavelength of light incident on the inclined surface 35b is λ, an incidence angle with respect to the inclined surface 35b is θ, a refractive index of the air gap portion 32C is $n_2$, and a refractive index of the prism portion 35 is $n_1$, a penetration depth ds of the evanescent component of the light incident on the inclined surface 35b is expressed by the following equation.

$$ds = \left\{ \frac{3\lambda/n_1}{2\pi(\sin\theta - (n_2/n_1)^2)^{1/2}} \right\} \quad [\text{Math. 1}]$$

For example, when the incidence angle θ is set to 45°, a refractive index $n_2$ of the air gap portion 32C is set to 1, and a refractive index $n_1$ of the prism portion 35 is set to 3.42 at both of the terahertz wave and the mid-infrared light, a penetration depth ds of the evanescent component of the terahertz waves T having a wavelength of 4 THz is calculated to be 23.0 μm and a penetration depth ds of the evanescent component of the mid-infrared light M having a wavelength of 10 μm is calculated to be 3.1 μm. Therefore, in this example, the distance d1 may be in a range of 3.1 μm to 23.0 μm.

Since the spacing of the air gap portion 32C is set to such a distance d1, the terahertz waves T incident on the inclined surface 35a is transmitted through the air gap portion 32C via the evanescent component of the terahertz waves T generated at the inclined surface 35a. On the other hand, the mid-infrared light M incident on the inclined surface 35a is not transmitted through the air gap portion 32C and is reflected by the air gap portion 32C.

The air gap portion 33C is provided inside the inside of the internal total reflection prism 30C. Specifically, the air gap portion 33C is provided between the inclined surface 35b and the inner surface 31g. The air gap portion 33C transmits the terahertz waves T from the placement surface 31c, into the prism portion 35 from the inner surface 31g to guide the terahertz waves T to the other side of the bottom surface 35c, and reflects the mid-infrared light M by means of the inclined surface 35b to guide the mid-infrared light M to the other side of the bottom surface 35c.

In the internal total reflection prism 30C according to this modification example, as illustrated in FIG. 9, the terahertz waves T emitted from the light source 10 is incident on the inside of the prism portion 35 from one side of the bottom surface 35c, is transmitted through the air gap portion 32C, is reflected by the side surface 31j, and then, is incident on the placement surface 31c. The terahertz waves T are totally reflected by the placement surface 31c, is reflected by the side surface 31k, is transmitted through the air gap portion 33C, and then, is emitted toward the terahertz wave detection unit 50 from the other side of the bottom surface 35c.

On the other hand, the mid-infrared light M emitted from the light source 10 is incident on the inside of the prism portion 35 from the one side of the bottom surface 35c coaxially with the terahertz waves T, and then is reflected by the air gap portion 32C. Thereafter, the mid-infrared light M is reflected by the air gap portion 33C via the attenuator 34 and is emitted toward the terahertz wave detection unit 50 from the other side of the bottom surface 35c coaxially with the terahertz waves T. In such an aspect, since only the terahertz waves T are guided to the placement surface 31c by the air gap portion 32C, it is possible to achieve the same effects as in the embodiment. Further, according to such an aspect, it is possible to avoid incidence of the mid-infrared light M on the measurement target 2 on the placement surface 31c using the air gap portion 32C with a simple configuration.

Fourth Modification Example

Figure 11:
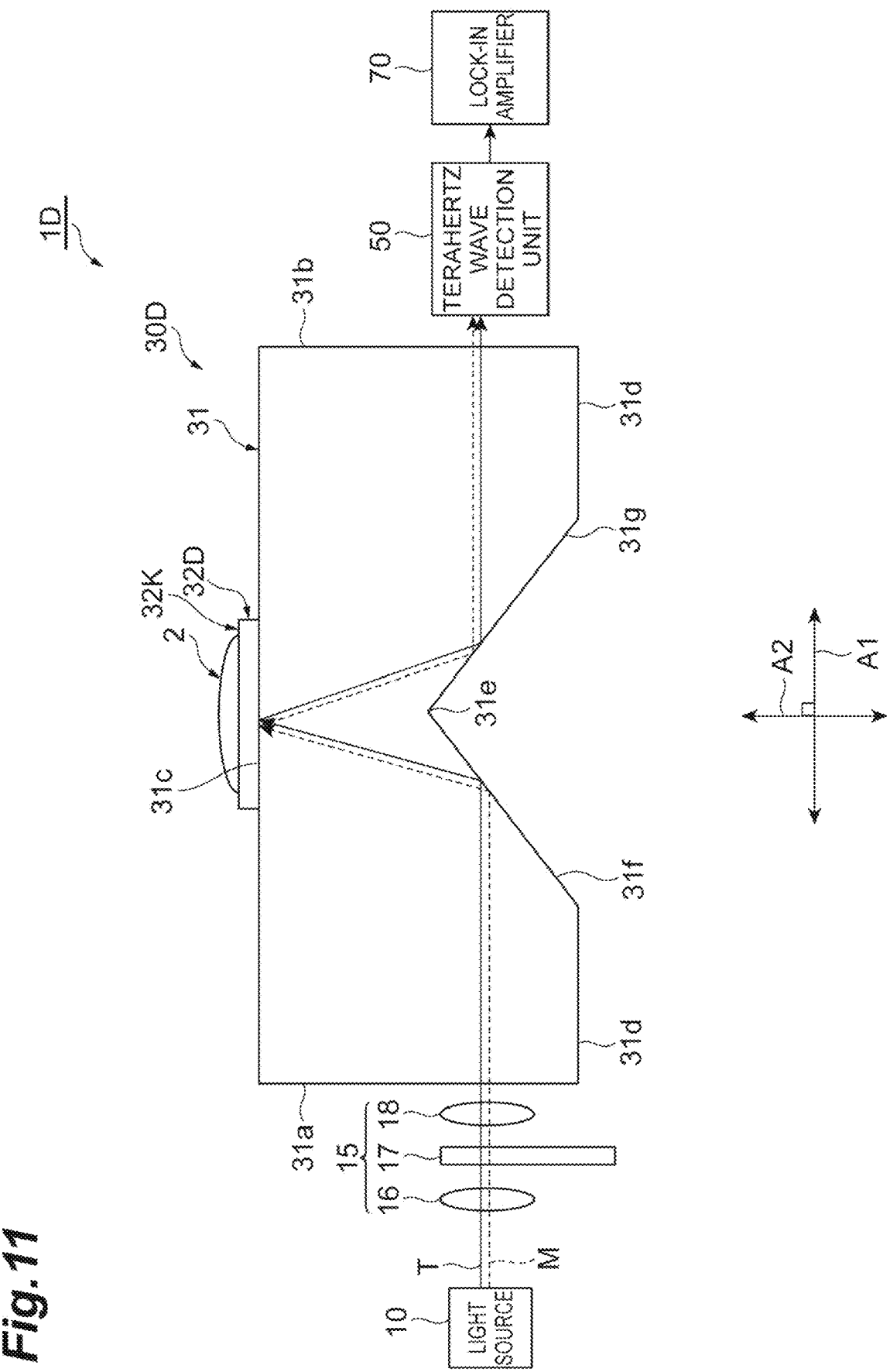
FIG. 11 is a configuration diagram illustrating a terahertz wave spectroscopic measurement device according to a fourth modification example.

FIG. 11 is a configuration diagram illustrating a terahertz wave spectroscopic measurement device 1D according to a fourth modification example of the embodiment. A difference between the embodiment and the fourth modification example is that an internal total reflection prism 3 OD of the fourth modification example does not include the optical combination portion 33L, and an optical branching portion 32L of the internal total reflection prism 30D is configured of an optical element 32D in place of the optical element 32.

The optical element 32D is disposed on an outer surface side of the placement surface 31c. The optical element 32D is, for example, a silicon plate on which a band pass filter that transmits only the terahertz waves T is formed. The optical element 32D transmits the terahertz waves T and reflects the mid-infrared light M to branch the terahertz waves T and the mid-infrared light M. When a band pass filter is applied to the optical element 32D, the band pass filter is formed on the outer surface side of the placement surface 31c.

It is preferable for a thickness of the optical element 32D to be sufficiently thin. Accordingly, it is possible to reduce a deviation between an optical path of the terahertz waves T and an optical path of the mid-infrared light M that has been via the optical element 32D. The thickness of the optical element 32D is, for example, 3.1 μm to 23.0 μm.

In the internal total reflection prism 30D according to the fourth modification example, the terahertz waves T and the mid-infrared light M incident on the main body portion 31 from the incidence surface 31a are totally reflected by the placement surface 31c. In this case, in the placement surface 31c, only an evanescent component of the terahertz waves T are transmitted through the optical element 32D and is incident on the measurement target 2, and an evanescent component of the mid-infrared light M does not reach the measurement target 2. Therefore, occurrence of an interaction between the mid-infrared light M and the measurement target 2 at the placement surface 31c can be suppressed. Further, according to this configuration, since the optical path of the terahertz waves T and the optical path of the mid-infrared light M in the internal total reflection prism 30D substantially match, it is possible to avoid an increase of a size of the device.

Fifth Modification Example

Figure 12:
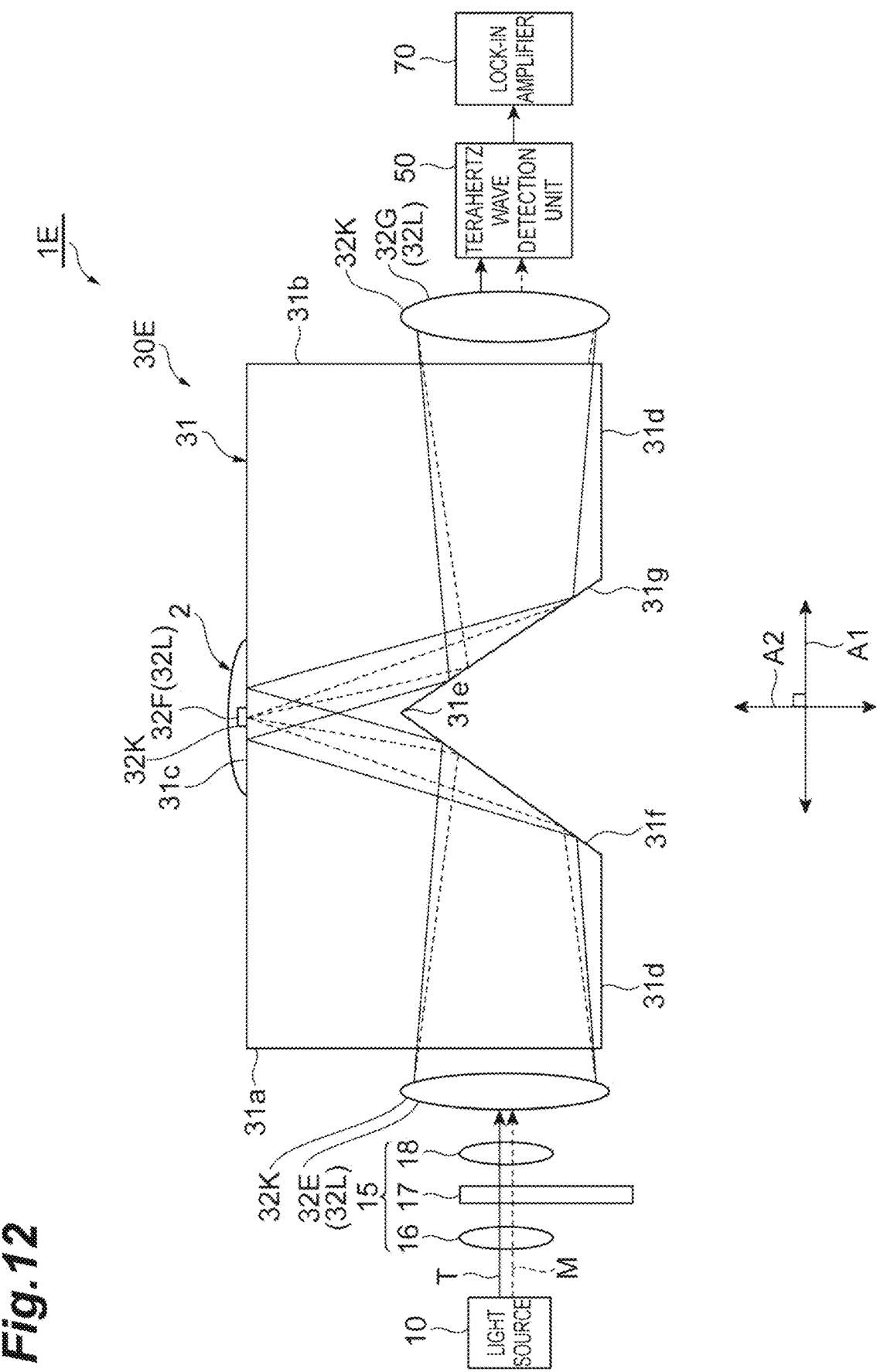
FIG. 12 is a configuration diagram illustrating a terahertz wave spectroscopic measurement device according to a fifth modification example.

FIG. 12 is a configuration diagram illustrating a terahertz wave spectroscopic measurement device 1E according to a fifth modification example of the embodiment. A difference between the embodiment and the fifth modification example is that an internal total reflection prism 30E of the fifth modification example does not include the optical combination portion 33L, and an optical branching portion 32L of the internal total reflection prism 30E includes a condensing lens 32E, a metal film 32F, and a collimating lens 32G, in place of the optical element 32.

The condensing lens 32E is disposed on an optical path between the light source 10 and the incidence surface 31a. The condensing lens 32E condenses the terahertz waves T and the mid-infrared light M emitted from the light source 10 on the placement surface 31c. The collimating lens 32G is disposed on the optical path between the emission surface 31b and the terahertz wave detection unit 50. The collimating lens 32G converts the terahertz waves T and the mid-infrared light M from the emission surface 31b into collimated light and then emits the collimated light to the terahertz wave detection unit 50. The condensing lens 32E and the collimating lens 32G are formed of a material (for example, silicon) having the same refractive index with respect to the terahertz waves T and the mid-infrared light M. Accordingly, condensing positions of the terahertz waves T and the mid-infrared light M can be matched on the placement surface 31c.

The metal film 32F is disposed on the outer surface side of the placement surface 31c. The metal film 32F is located at a center of a condensing point of the terahertz waves T and the mid-infrared light M condensed by the condensing lens 32E. The metal film 32F has an area smaller than a condensing diameter of the terahertz waves T on the placement surface 31c and larger than a condensing diameter of the mid-infrared light M on the placement surface 31c.

Generally, a magnitude of a condensing diameter of light depends on a magnitude of the wavelength. In the embodiment, the condensing diameter of the terahertz waves T are, for example, about 20 times larger than the condensing diameter of the mid-infrared light M. Therefore, most of the terahertz waves T other than a part (that is, a portion at which the condensing diameter of the terahertz waves T and the metal film 32F overlap) of the terahertz waves T on the placement surface 31c is not reflected by the metal film 32F but is incident on the measurement target 2, whereas the mid-infrared light M is not incident on the measurement target 2 but is reflected by the metal film 32F.

In such an aspect, it is possible to reflect the mid-infrared light M using the metal film 32F disposed on the placement surface 31c and cause only the terahertz waves T to be selectively incident on the measurement target 2. Therefore, it is possible to obtain the same effects as in the embodiment. Further, it is possible to avoid incidence of the mid-infrared light M on the measurement target 2 on the placement surface 31c using the metal film 32F with a simple configuration.

Sixth Modification Example

Figure 13:
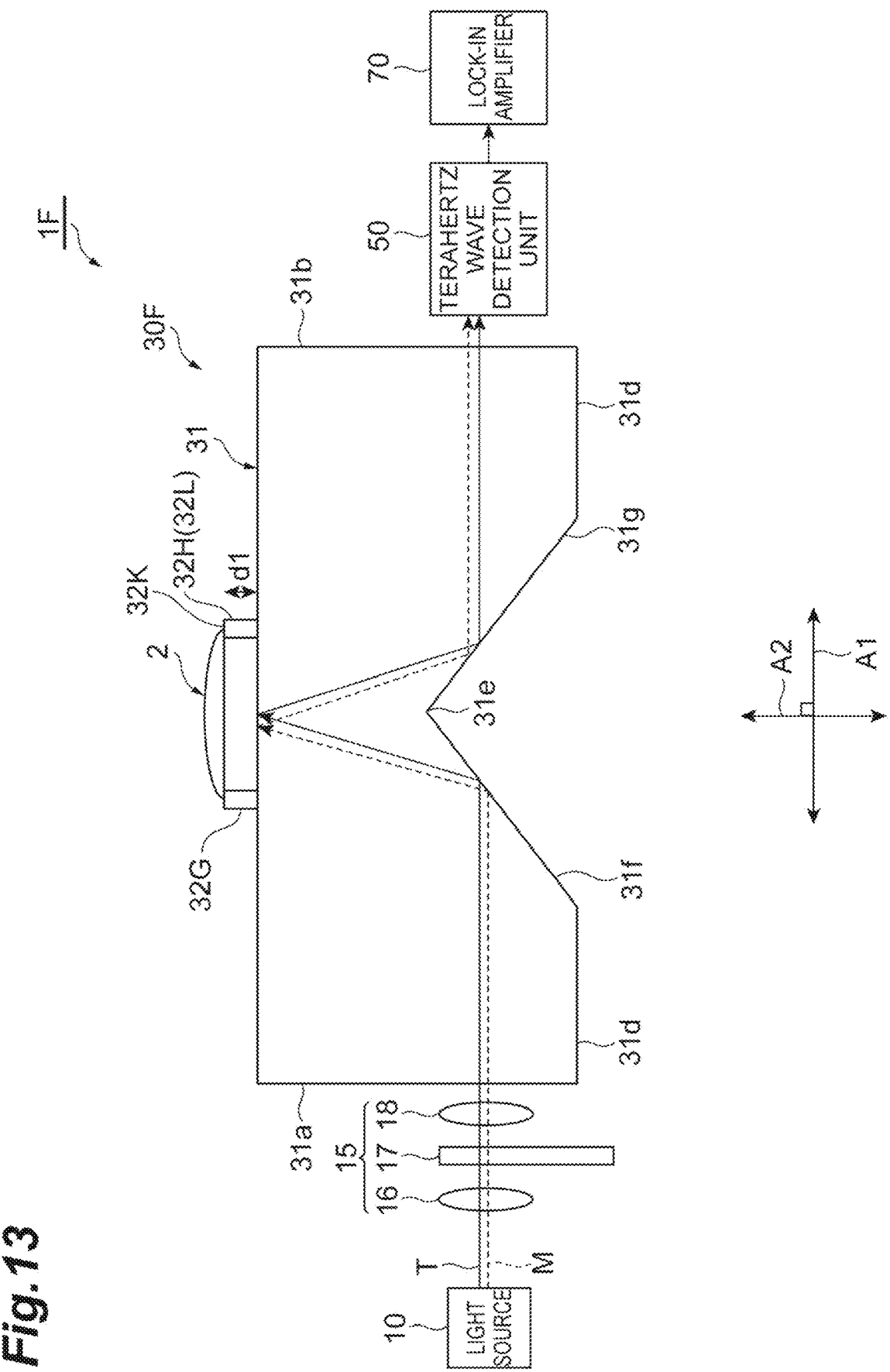
FIG. 13 is a configuration diagram illustrating a terahertz wave spectroscopic measurement device according to a sixth modification example.

FIG. 13 is a configuration diagram illustrating a terahertz wave spectroscopic measurement device 1F according to a sixth modification example of the embodiment. A difference between the embodiment and the sixth modification example is that an internal total reflection prism 30F of the sixth modification example does not include the optical combination portion 33L, and an optical branching portion 32L of the internal total reflection prism 30F includes a spacer 32H in place of the optical element 32.

The spacer 32H is disposed on the placement surface 31c. Specifically, the spacer 32H is an annular member formed of, for example, a resin or metal. The spacer 32H causes the placement surface 31c and the measurement target 2 to be spaced by a distance d1. The distance d1 is smaller than a penetration depth of the evanescent component of the terahertz waves T on the placement surface 31c and larger than a penetration depth of the evanescent component of the mid-infrared light M on the placement surface 31c. Therefore, the terahertz waves T and the mid-infrared light M are branched on the placement surface 31c, and only the evanescent component of the terahertz waves T are incident on the measurement target 2 on the spacer 32H.

In such an aspect, it is possible to cause only the terahertz waves T to be selectively incident on the measurement target 2 using the spacer 32H between the placement surface 31c and the measurement target 2. Therefore, it is possible to obtain the same effects as in the embodiment. Further, it is possible to avoid incidence of the mid-infrared light M on the measurement target 2 on the placement surface 31c using the spacer 32H with a simple configuration.

Seventh Modification Example

Figure 14:
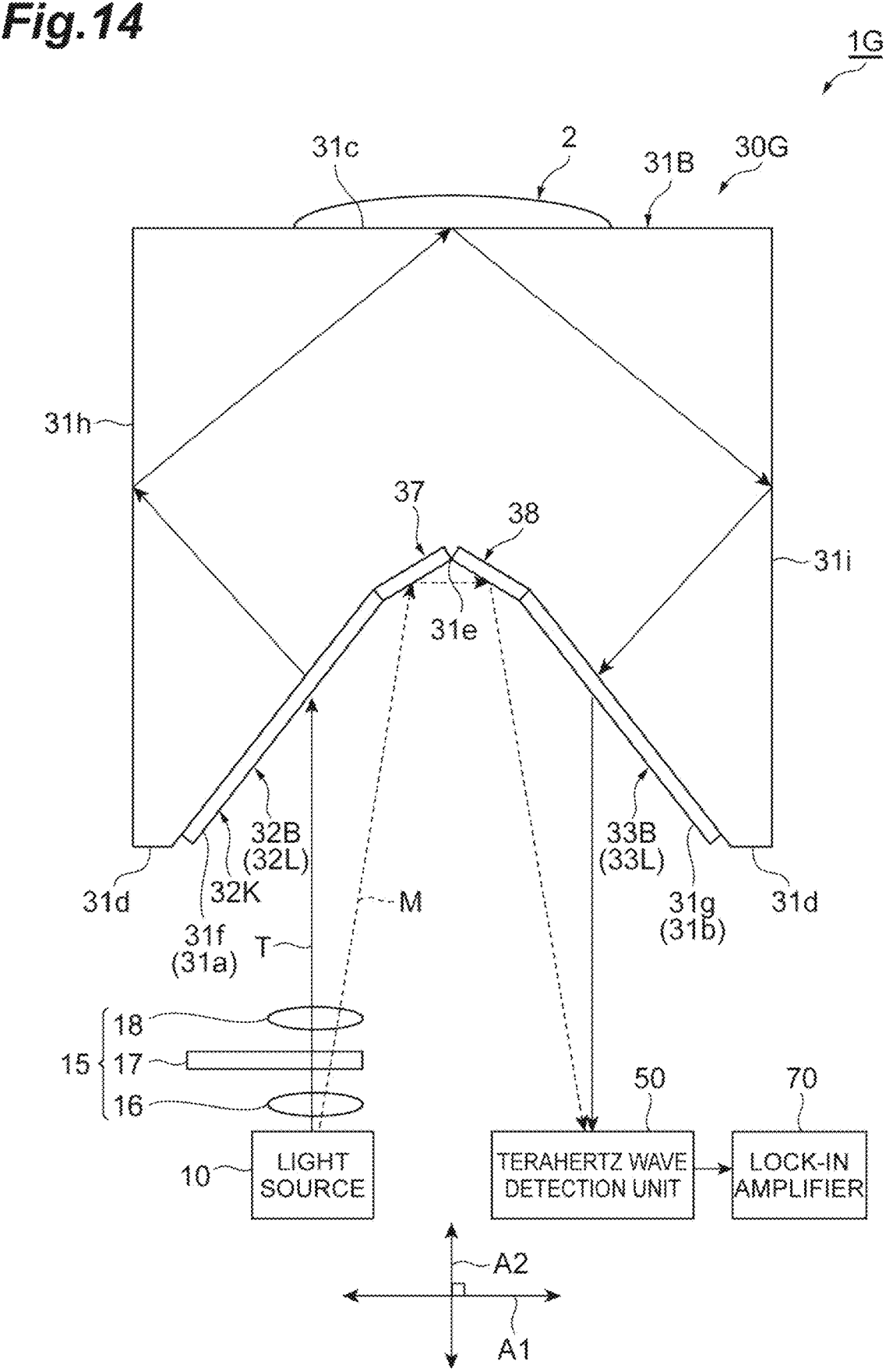
FIG. 14 is a configuration diagram illustrating a terahertz wave spectroscopic measurement device according to a seventh modification example.

FIG. 14 is a configuration diagram illustrating a terahertz wave spectroscopic measurement device 1G according to a seventh modification example of the embodiment. In the embodiment, an example in which the optical axes of the terahertz waves T and the mid-infrared light M incident on the incidence surface 31a and the optical axes of the terahertz waves T and the mid-infrared light M emitted from the emission surface 31b are coaxial has been illustrated, but the optical axes may not be coaxial. In the seventh modification example, an example in which the mid-infrared light M emitted from the light source 10 travels along a different direction from the terahertz waves T are illustrated.

The internal total reflection prism 30G includes a mirror 37 and a mirror 38, in addition to the configuration of the internal total reflection prism 30B (see FIG. 8). The mirror 37 is optically coupled to the light source 10 and is disposed side by side with the optical element 32B on the inner surface 31f. The mirror 37 reflects the mid-infrared light M emitted from the light source 10 toward the mirror 38. The mirror 38 is optically coupled to the light source 10 and is disposed side by side with the optical element 33B on the inner surface 31f. The mirror 38 reflects the mid-infrared light M reflected by the mirror 37 toward the terahertz wave detection unit 50.

In the internal total reflection prism 30G according to the seventh modification example, the terahertz waves T emitted from the light source 10 is transmitted through the optical element 32B from the inner surface 31f, is reflected by the side surface 31h, and is incident on the placement surface 31c. The terahertz waves T are totally reflected by the placement surface 31c, is reflected by the side surface 31i, and then, is transmitted through the optical element 33B toward the terahertz wave detection unit 50. On the other hand, the mid-infrared light M emitted in a different direction from with the terahertz waves T from the light source 10 is reflected by the mirror 37, and then, is reflected toward the terahertz wave detection unit 50 by the mirror 38. In such an aspect, since only the terahertz waves T are guided to the placement surface 31c, it is possible to achieve the same effects as in the embodiment.

Eighth Modification Example

FIG. 15 is a configuration diagram illustrating a terahertz wave detection unit 50A according to an eighth modification example of the embodiment. A difference between the embodiment and the eighth modification example is a configuration of the terahertz wave detection unit. The terahertz wave detection unit 50A of the eighth modification example includes a nonlinear optical crystal 60, a cut filter 61, and a photodetector 62. The cut filter 61 can transmit light having some wavelengths. The cut filter 61 is, for example, a low pass filter, a high pass filter, a band pass filter, or a dichroic mirror, which is formed of a dielectric multilayer film or the like.

The nonlinear optical crystal 60 is optically coupled to the emission surface 31b of the internal total reflection prism 30. When the terahertz waves T and the mid-infrared light M are simultaneously incident on the nonlinear optical crystal 60, the nonlinear optical crystal 60 generates the converted light C having a different wavelength from those of the terahertz waves T and the mid-infrared light M due to generation (that is, wavelength conversion) of a difference frequency or a sum frequency between the terahertz waves T and the mid-infrared light M.

Although the terahertz waves T, the mid-infrared light M, and the converted light C all travel in the same direction in the eighth modification example (and the embodiment), the terahertz waves T, the mid-infrared light M, and the converted light C may travel in different directions so that a phase matching condition is satisfied when the nonlinear optical crystal 60 has refractive index wavelength dispersion characteristics. In such a case, by using a periodical polarization reversal crystal in which the polarization of the nonlinear optical crystal 60 is periodically reversed, it is possible to cause the terahertz waves T, the mid-infrared light M, and the converted light C to travel in the same direction while satisfying the phase matching condition.

The cut filter 61 is disposed on an optical path between the nonlinear optical crystal 60 and the photodetector 62. The cut filter 61 cuts the mid-infrared light M emitted from the nonlinear optical crystal 60 and transmits the converted light C. The photodetector 62 includes, for example, a photodiode, detects power of the converted light C transmitted through the cut filter 61, and outputs an electric signal having a value according to the detected power. Thus, the terahertz waves T are indirectly detected using the detected converted light C, and information on the measurement target 2 is acquired. In such an aspect, it is possible to achieve the same effects as in the embodiment.

The terahertz wave spectroscopic measurement device of the present disclosure is not limited to the above-described embodiment and each modification example, and various other modifications are possible. For example, the above-described embodiment and each modification example may be combined with each other according to necessary purposes and effects. Further, in the embodiment and each modification example described above, the mid-infrared light is illustrated as the probe light, but the probe light is not limited to the mid-infrared light. The probe light may be, for example, light having any wavelength from visible light to mid-infrared light. For example, the probe light may be near infrared light.

What is claimed is:

1. A terahertz wave spectroscopic measurement device comprising:
    a light source that emits terahertz waves and probe light having a wavelength different from that of the terahertz waves;
    an internal total reflection prism including an incidence surface of the terahertz waves, a placement surface on which a measurement target is placed, and an emission surface of the terahertz waves, the internal total reflection prism internally totally reflecting the terahertz waves incident from the incidence surface by means of the placement surface and emitting the terahertz waves from the emission surface; and
    a terahertz wave detection unit that indirectly detects the terahertz waves emitted from the emission surface using the probe light,
    wherein the internal total reflection prism includes an avoidance portion on which incidence of the probe light on the measurement target on the placement surface is avoided.

2. The terahertz wave spectroscopic measurement device according to claim 1, wherein the avoidance portion includes an optical branching portion that guides the terahertz waves to the placement surface and does not guide the probe light to the placement surface.

3. The terahertz wave spectroscopic measurement device according to claim 2, wherein the optical branching portion includes an optical element that reflects the terahertz waves incident on the internal total reflection prism from the incidence surface, toward the placement surface, and transmits the probe light incident on the internal total reflection prism from the incidence surface, toward the emission surface.

4. The terahertz wave spectroscopic measurement device according to claim 2, wherein the optical branching portion includes an optical element that guides the terahertz waves incident on the internal total reflection prism from the incidence surface, to the emission surface via the placement surface, and reflects the probe light by means of the incidence surface to guide the probe light to the emission surface without being incident on the internal total reflection prism.

5. The terahertz wave spectroscopic measurement device according to claim 2,
    wherein the optical branching portion includes an air gap portion provided in the internal total reflection prism, and
    a spacing of the air gap portion is smaller than a penetration depth of an evanescent component of the terahertz waves at an interface with the internal total reflection prism and is larger than a penetration depth of an evanescent component of the probe light at the interface.

6. The terahertz wave spectroscopic measurement device according to claim 1, wherein the avoidance portion includes an optical branching portion that branches, on the placement surface, the terahertz waves and the probe light incident on the internal total reflection prism.

7. The terahertz wave spectroscopic measurement device according to claim 6, wherein the optical branching portion includes an optical element that is disposed on the placement surface to transmit the terahertz waves and reflect the probe light.

8. The terahertz wave spectroscopic measurement device according to claim 6, wherein the optical branching portion includes
    a condensing lens that condenses the terahertz waves and the probe light on the placement surface, and
    a metal film that is disposed on the placement surface and has an area smaller than a condensing diameter of the terahertz waves on the placement surface and larger than a condensing diameter of the probe light on the placement surface.

9. The terahertz wave spectroscopic measurement device according to claim 6, wherein the optical branching portion includes a spacer that is disposed on the placement surface and forms a spacing smaller than a penetration depth of an evanescent component of the terahertz waves on the placement surface and larger than a penetration depth of an evanescent component of the probe light on the placement surface, between the placement surface and the measurement target.

10. The terahertz wave spectroscopic measurement device according to claim 1,
   wherein optical axes of the terahertz waves and the probe light incident on the incidence surface are coaxial, and
   optical axes of the terahertz waves and the probe light emitted from the emission surface are coaxial.

11. The terahertz wave spectroscopic measurement device according to claim 1, further comprising an attenuator that attenuates an intensity of the probe light.

\* \* \* \* \*